United States Patent
Anjaneyapura Range et al.

(10) Patent No.: US 12,052,285 B1
(45) Date of Patent: Jul. 30, 2024

(54) ISOLATION TECHNIQUES AT EXECUTION PLATFORMS USED FOR SENSITIVE DATA ANALYSIS

(71) Applicant: Amazon Technologies, Inc., Seattle, WA (US)

(72) Inventors: Gowda Dayananda Anjaneyapura Range, Redmond, WA (US); Srinivasan Sankaran, Bothell, WA (US); Leo Dirac, Seattle, WA (US); Lakshmi Naarayanan Ramakrishnan, Redmond, WA (US); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1009 days.

(21) Appl. No.: 16/267,332

(22) Filed: Feb. 4, 2019

Related U.S. Application Data

(60) Provisional application No. 62/770,558, filed on Nov. 21, 2018.

(51) Int. Cl.
| | |
|---|---|
| *H04L 9/40* | (2022.01) |
| *G06F 9/50* | (2006.01) |
| *G06F 9/54* | (2006.01) |
| *G06F 21/53* | (2013.01) |
| *G06N 20/00* | (2019.01) |
| *H04L 9/32* | (2006.01) |
| *H04L 47/78* | (2022.01) |

(52) U.S. Cl.
CPC ............ *H04L 63/20* (2013.01); *G06F 9/5077* (2013.01); *G06F 9/544* (2013.01); *G06F 21/53* (2013.01); *G06N 20/00* (2019.01); *H04L 9/3228* (2013.01); *H04L 47/78* (2013.01)

(58) Field of Classification Search
CPC ....... H04L 63/20; H04L 9/3228; H04L 47/78; G06N 20/00; G06F 9/5077; G06F 9/544; G06F 21/552; G06F 18/254
See application file for complete search history.

(56) References Cited

U.S. PATENT DOCUMENTS 7,124,291 B1 * 10/2006 Fresko ................ G06F 9/44563
718/1
7,421,698 B2 * 9/2008 Fresko .................. G06F 9/4843
719/310

(Continued)

OTHER PUBLICATIONS

Isolation, Resource Management and Sharing in the Kaffeos Java Runtime System, Publication Year May 2002, Godmar Back, School of Computing The University of Utah.*

(Continued)

*Primary Examiner* — William S Powers
*Assistant Examiner* — Gita Faramarzi
(74) *Attorney, Agent, or Firm* — Robert C. Kowert; Kowert, Hood, Munyon, Rankin & Goetzel, P.C.

(57) ABSTRACT

At a first resource to be used to perform a computing operation, a pair of execution environments is configured. I/O permissions of programs running in the different environments are based on respective sets of constraints. A program performs the operation in one of the environments, with input data being provided to the program from the second environment. A result of the operation is provided to a destination from the second environment.

20 Claims, 10 Drawing Sheets

(56) References Cited

U.S. PATENT DOCUMENTS

| | | | | |
|---|---|---|---|---|
| 8,074,229 | B2* | 12/2011 | Brunswig | G06F 9/544 |
| | | | | 719/312 |
| 8,868,710 | B2 | 10/2014 | Schultze | |
| 9,680,874 | B1* | 6/2017 | Burnett | G06F 21/566 |
| 10,262,390 | B1* | 4/2019 | Sun | G06F 9/5077 |
| 10,461,933 | B2* | 10/2019 | Le Saint | H04L 63/0428 |
| 2014/0040519 | A1* | 2/2014 | Ur | G06F 9/526 |
| | | | | 710/200 |
| 2016/0224785 | A1* | 8/2016 | Wagner | G06F 21/552 |
| 2017/0034198 | A1* | 2/2017 | Powers | H04L 63/1441 |
| 2018/0329733 | A1* | 11/2018 | Aronov | G06F 9/45558 |
| 2019/0108355 | A1* | 4/2019 | Carson | G06F 21/6245 |
| 2019/0171811 | A1* | 6/2019 | Daniel | G06F 9/5077 |
| 2019/0373331 | A1* | 12/2019 | Benzatti | H04N 21/4668 |

OTHER PUBLICATIONS

Composing Expressive Run-time Security Policies, Publication Year Dec. 2007, Lujo Bauer, ACM Journal Name, vol. V, No. N.*
A Study of Security Isolation Techniques, Publication Year Oct. 2016. Rui Shu, Peipei Wang, Sigmund A. Gorski III, Benjamin Andow, Adwait Nadkarni, Luke Deshotels, Jason Gionta, William Enck, and Xiaohui Gu, ACM Computing Surveys, vol. 49, No. 3, Article 50, Publication.*
Amazon, "Amazon Elastic Container Service Developer", API Version Nov. 13, 2014, pp. 1-558.
Amazon, Amazon Machine Learning Developer Guide, Version Latest, Copyright 2019, pp. 1-139.
Amazon, "Amazon SageMaker Developr Guide", Updated Nov. 28, 2018, pp. 1-916.

* cited by examiner

ISOLATION TECHNIQUES AT EXECUTION PLATFORMS USED FOR SENSITIVE DATA ANALYSIS

BACKGROUND

This application claims benefit of priority to U.S. Provisional Application No. 62/770,558 filed Nov. 21, 2018, titled "Isolation Techniques At Execution Platforms Used For Sensitive Data Analysis," which is hereby incorporated by reference in its entirety.

In recent years, more and more computing applications are being run at provider networks or cloud-based platforms. Often, a provider network may enable clients to acquire resources, such as virtual and/or physical computing devices, storage devices, and the like via easy-to-use programmatic interfaces, and run applications using combinations of the resources, with the provider network providing desired levels of scalability, availability, fault resilience and the like. The physical machines of the provider network may be distributed among numerous data centers in different cities, states or countries, in some cases enabling clients anywhere in the world to utilize a near-inexhaustible pool of resources.

In some cases, clients of such networks may develop applications within their own organizations, and use the resources of the provider network primarily as a scalable computing and storage platform on which to run such internally-developed applications. However, for many organizations, it may not be practicable to design and build all their own applications, especially when sophisticated programming skills as well as subject-matter expertise may be required. In some cases, the provider network may provide a catalog of various types of application programs that have been developed and tested at the provider network operator's own organization, and clients may deploy applications from such catalogs using the provider network's resources.

Even the combination of the provider network's applications and client-developed applications may not be sufficient, especially in fast moving domains such as machine learning and artificial intelligence. In some cases, applications developed by third parties may be run using provider network resources, in principle greatly expanding the kinds of applications that can be used by clients of the provider network. However, many applications may involve analysis and processing of sensitive data sets of the clients, and preventing the misuse or misappropriation of such data may represent a non-trivial requirement when the processing is performed using resources of a provider network. Similarly, from the perspective of the third party application providers, protecting their application code (e.g., from being stolen or copied) while allowing clients to run the applications using resources of a provider network may also represent a challenge.

Figure 1:
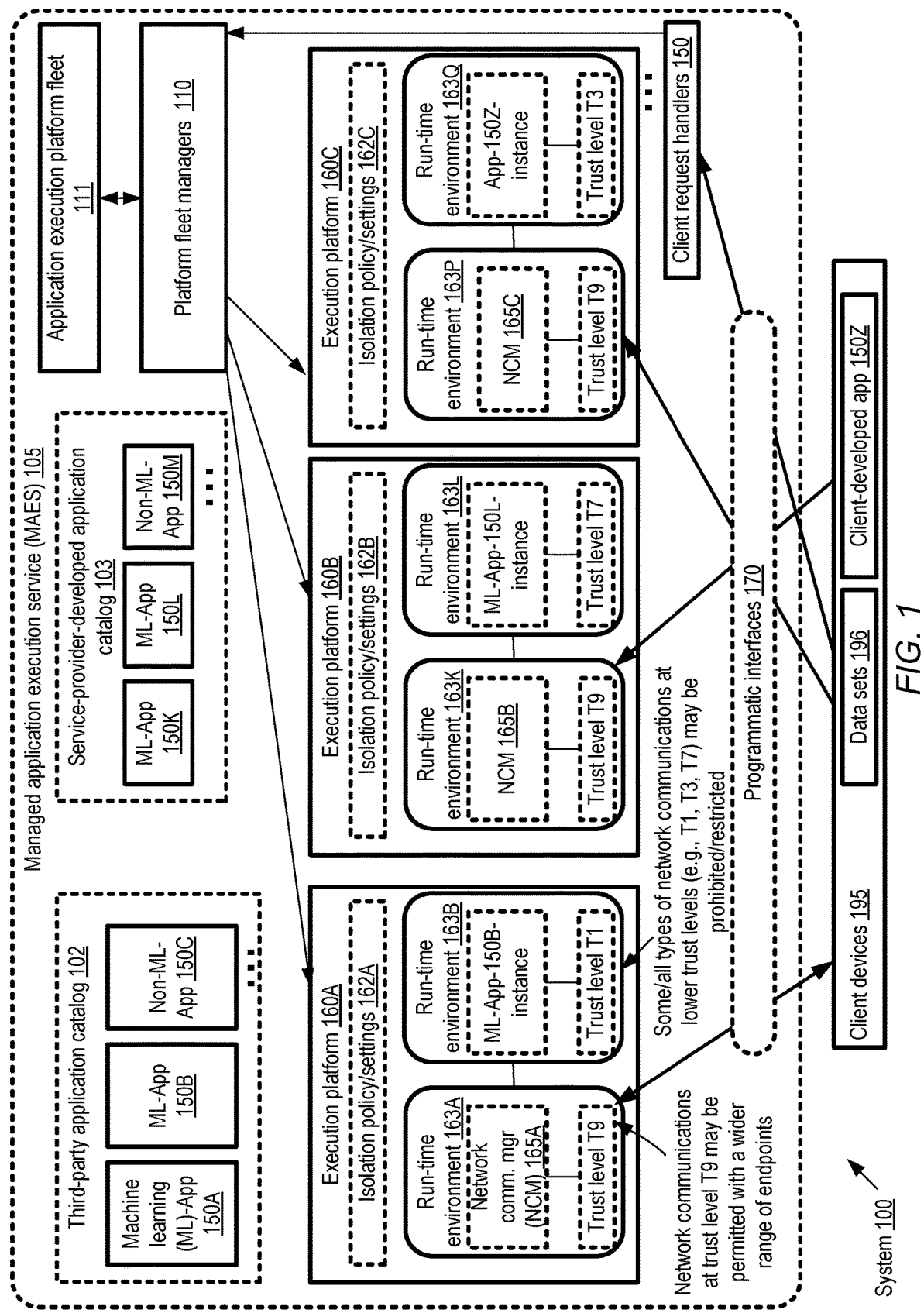
FIG. 1 illustrates an example system environment in which sensitive data being processed using applications from a variety of sources, as well as the applications themselves, may be protected using configurable isolation techniques at a network-accessible service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing customizable isolation techniques to secure and protect potentially sensitive data, as well as programs that may be deployed to process such data at sharable execution platforms, are described. In at least some embodiments, such techniques may be implemented at a network-accessible service of a provider network, whose resources may be acquired by clients to implement applications obtained from a variety of sources. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment.

The resources of a provider network may in some cases be distributed across multiple data centers, which in turn may be distributed among numerous geographical regions (e.g., with each region corresponding to one or more cities, states or countries). In some embodiments, the customizable isolation techniques may be implemented, for example, at a managed application execution service (MAES) of a provider network, which provides at least partially pre-configured execution platforms to its clients. In one embodiment, the application programs that analyze and process the sensitive data may include machine learning or artificial intelligence programs, and the network-accessible service may be primarily used for machine learning or artificial intelligence applications. In other embodiments, the applications that process potentially sensitive data may not necessarily be machine learning related or artificial intelligence related; the isolation techniques described herein may be used with equal success for a variety of application types covering different problem domains.

In various embodiments, security-related requirements or objectives of at least two types of entities may be satisfied using the isolation techniques described herein: (a) application users or clients who wish to prevent loss, copying or misuse of their sensitive data, while still being able to use resources of large-scale multi-user network-accessible services to implement applications that analyze their data and (b) application providers, developers or vendors who wish to protect the intellectual property represented by their algorithms or programs, while enabling potentially large numbers of users of their applications to run the applications on sensitive input data at the network-accessible services. In at least some embodiments, a network-accessible service such as an MAES may, in response to programmatic requests to run applications, quickly provide platforms with a plurality of run-time environments (e.g., one environment primarily for an application instance, and the other primarily to act as a secure intermediary for inbound and outbound data) whose networking and/or other configuration parameters have been selected to as to achieve the combination of objectives mentioned above. The speed and efficiency with which resources are brought online may significantly reduce the time and effort required by clients to start using their desired applications, e.g., compared to scenarios in which the clients themselves have to set up and secure the application environments.

According to at least some embodiments, a system may comprise one or more computing devices of a network-accessible service, such as a managed application execution service of a provider network. The computing devices may include instructions that when executed on or across one or more processors cause a number of control-plane and/or data-plane operations of the service to be initiated. Control-plane operations may be largely associated with administrative tasks such as provisioning resources, configuring resources (e.g., in accordance with isolation requirements), allocating resources and the like in different embodiments. Data-plane operations may include tasks primarily associated with running applications on behalf of clients of the service on resources allocated to the clients, transferring data and results of such applications, and so on. In some embodiments, the computing devices may obtain an indication of an isolation policy or setting to be applied/used with respect to one or more machine learning operations (such as training one or more models, or using a previously-trained model for inference or prediction) to be performed on behalf of a client. In one embodiment, the isolation policy may be implicitly or explicitly indicated by the client, e.g., as part of a request to run a specified application to perform the operations. In other embodiments, the isolation policy may be obtained or determined by the service itself, e.g., based on the type of operations to be performed or the application to be used, without specific isolation-related guidance from the client.

One or more resources, e.g., selected from a pool of resources maintained by or accessible to the service, may be allocated, assigned or identified for the operations to be performed on behalf of the client in various embodiments. Individual ones of the resources may, for example, comprise physical machines, virtual machines or the like in different embodiments. In some cases, the MAES may be one of several network-accessible services implemented at a provider network or cloud-computing environment, and the resources may comprise virtual machines of a virtualized computing service of such a provider network, or other computing platforms of another computing service of the provider network. In at least some embodiments, a plurality of run-time environments may be set up at a given resource allocated for the machine learning operations. The terms "run-time environment", "program execution environment" and "execution environment" may be used synonymously with respect to at least some embodiments. The particular type of run-time or execution environments configured may differ in different embodiments. For example, in one embodiment, each run-time environment may be a respective software container, and the different run-time environments may be implemented within a single virtual machine (the resource allocated by the service), while in another embodiment, the resource allocated by the service may comprise a physical host, and respective virtual machines may be used as the run-time environments. At least one execution environment may be designated to run an instance of the application in some embodiments, while another execution environment may be designated to (a) obtain (potentially sensitive) data from one or more data sources and pass that data to the application instance and (b) obtain results/output from the application instance (if such output is to be transmitted outside the resource being used for the application instance) and pass the results/output to some set of destinations. In at least one embodiment, a resource allocated by the MAES for the operations may already have one run-time environment pre-configured (e.g., as part of a warm pool of run-time environments established in advance), and only the second run-time environment may have to be set up when an indication of the operations to be performed on behalf of the client is obtained.

In various embodiments, the set of input/output (I/O) permissions granted to one or more programs running within the respective run-time environments may differ from one of the run-time environments to another. For example, if execution environments EE1 and EE2 are set up at a given resource such as a virtual or physical machine, the set of permissions P1 granted to programs of EE1 with respect to network I/O and/or storage device I/O may be based on a first set of constraints (e.g., "no network I/O permitted", "only reads from storage volume V1 permitted"), while the set of permissions P2 granted to programs of EE2 may be based on a different set of constraints (e.g., "network transfers to/from IP address range R1 permitted", "read/write access to V1 permitted"). Such constraints may represent different levels of trust in at least some embodiments—e.g., if a third-party application is to be run within the first execution environment, that environment may be granted a lower level of trust (from the perspective of the client on whose behalf the application is to be run) than the second execution environment (which serves as an intermediary for inbound data and outbound results of the application). Different sets of constraints may be used for reads versus writes to portions or all of storage or memory in some embodiments, or for inbound versus outbound network communications. In at least some embodiments, for some types of applications, the computing devices of the network-accessible service may configure one of the execution environments such that a program running within that environment is prohibited from communicating over a network with at least a first set of network endpoints (where the set could in some cases be quite large, such as the whole public Internet). In contrast, in such an embodiment, another of the execution environments may be permitted to communicate with a set of one or more endpoints. In at least some embodiments, respective virtual network interfaces (which may be supported by a virtualized computing service as discussed in further detail below), with respective set of security settings for inbound and/or outgoing traffic, may be configured for implementing the desired levels of isolation for the execution environments.

After the execution environments have been configured, in various embodiments an application program (or programs) selected by the client may perform one or more of the operations or tasks (e.g., machine learning operations) within a first execution environment, with the input data set of the application being provided from a second execution environment. In some such embodiments, a trusted intermediary such as a network communication manager running within the second execution environment may have been granted the appropriate permissions and privileges to use a network to obtain the input data, and to provide the input data using a local communication channel to the application program(s) running in the first execution environment. In some embodiments in which the application produces a result which is to be provided to some destination, the result may be obtained by the trusted intermediary within the second execution environment using a local communication channel, and forwarded/transmitted over a network to the destination. A number of different types of local communication channels may be used in different embodiments—e.g., in-memory buffers may be used, a local storage volume or file system may be used, and so on.

As a result of prohibiting or restricting the ability of the application program to use a network, the probability of sensitive data of the client being transmitted to an undesired recipient may be significantly reduced in various embodiments. In some embodiments, the application program may be prohibited from making a persistent copy of the input data, thereby further reducing the likelihood of data misappropriation. In one embodiment, even though the application program may be granted write access to a local persistent storage device (e.g., to store intermediary or final results), additional techniques may be employed to prevent the potential misuse of the storage. For example, writes to a local persistent storage device may be encrypted using a one-time-use-only key in some embodiments, such that after the application completes its work and its execution environment is terminated, the writes to the storage device become unreadable. In at least one embodiment, the persistent storage devices used by an execution environment of an application may be "zeroed out" or scrubbed after the application's work is completed, e.g., as part of freeing the resources used by the application for potential re-use. Furthermore, by isolating the application program within its own tightly-constrained (from an I/O perspective) execution environment, the probability of copying or reverse-engineering the application program itself may also be significantly reduced in various embodiments.

As one skilled in the art will appreciate in light of this disclosure, certain embodiments may be capable of achieving various advantages, including some or all of the following: (a) enhancing the security of potentially sensitive data sets that may be used as inputs for applications running at resources of a provider network or other multi-user/multi-tenant environments, or may be produced as outputs by such applications, (b) enhancing the security of the applications themselves, e.g., by preventing the copying of the application code, reverse-engineering using intermediate results, application log records or the like, and/or (c) reducing, using execution platforms that have been pre-configured to meet client-specified isolation requirements and/or other requirements, the overall time and computing resources needed to complete potentially complex tasks, such as training machine learning models, performing batch or real-time inference or predictions, etc.

In at least some embodiments, the managed application execution service (MAES) may provide one or more on-line catalogs of application programs that can be used by clients that wish to employ the isolation-related techniques described above. Some catalogs may, for example, include applications developed by third parties (entities other than the operator of the MAES) and made available to potential clients via the MAES. Other catalogs may include applications developed by or under the supervision of the same organization that implements the MAES in one embodiment. A client may, if desired, view contents of such catalogs (e.g., the entire catalog or a filtered subset), and indicate that a particular application from a catalog has been selected for execution using MAES resources in such embodiments. Clients may execute their own in-house applications (e.g., an application developed at an organization to which the client belongs, or under the supervision of such an organization, and not necessarily included in an on-line catalog) using MAES resources in at least some embodiments. Isolation policies using the techniques described herein may be applied for various applications regardless of the provider/designer/developer of the application in at least some embodiments.

In various embodiments, the specific isolation policies or settings, and/or the constraints to be used to configure the execution environments used for the applications, may be customizable by clients of the MAES (and/or by the third party application providers). In at least some embodiments, the restrictions to be placed on network and/or storage I/O from one or more of the execution environments may be optional—e.g., by default, no restrictions may be placed on network transfers to/from one or more of the execution environments. In one embodiment, the MAES may include an isolation recommendation manager implemented at one or more computing devices. Such an isolation recommendation manager may, for example, monitor client requests for application deployment, and may recommend particular isolation settings or policies for one or more applications (e.g., based on such factors as the problem domain being addressed by the application, how long the application has been available for deployment at the MAES, comments/feedback provided to the MAES by previous users of the application, the provider of the application, etc.). In one embodiment, some requests for executing an application using the MAES may be rejected if the requests do not indicate a particular isolation policy or setting (e.g., a minimal level of isolation may be required for at least some applications).

In some embodiments in which a client uses the MAES for machine learning applications, batch mode jobs (e.g., model training, or batch-mode inference/prediction) and/or real-time tasks (e.g., on-line or immediate inference/prediction using a pre-trained model) may be implemented using the isolation techniques introduced above. In at least some embodiments, a plurality of nodes of a distributed application (e.g., a distributed training of a complex machine learning model) may be required to perform the operations requested by a client, and such nodes may have to communicate with one another. In one such embodiment, instead of preventing any network communication to/from an execution environment used for running the application, individual nodes of the distributed application may be run at respective execution environments, and network communication may be permitted among the peer group of application nodes.

Example System Environment

FIG. 1 illustrates an example system environment in which sensitive data being processed using applications from a variety of sources, as well as the applications themselves, may be protected using configurable isolation techniques at a network-accessible service, according to at least some embodiments. As shown, system 100 may comprise various resources and artifacts of a managed application execution service (MAES) 105, including an application execution platform fleet 111 from which various execution platforms 160 (such as 160A, 160B or 160C) may be allocated or assigned to run a variety of applications on behalf of MAES clients in the depicted embodiment. The MAES may implement one or more programmatic interfaces 170 in various embodiments, such as web-based consoles, a set of application programming interfaces (APIs), command line tools, graphical user interfaces or the like, which can be used to submit various types of requests (and receive corresponding responses) from client devices 195. A given client device 195 may, for example, comprise a desktop, laptop, server, tablet computing device, phone, or other device which can be used to submit and/or receive network messages in the depicted embodiment.

Clients of the MAES may choose to run any of various categories of applications on execution platforms 160 (e.g. 160A, 160B, and 160C) of the fleet 111 in the depicted embodiment. Some applications may be presented to potential clients as part of a third-party application catalog 102, while others may be part of another catalog 103 which includes applications developed or generated by the same organization that implements the MAES (the latter category of applications may be referred to as server-provider-developed applications, service-provider-generated applications or service-provider-supervised applications, indicating that the operator of the MAES participated in or controlled/supervised the design and/or development of the applications). Third party application vendors may request that their applications, such as machine learning application (ML-App) 150A, ML-App 150B or non-machine learning application (Non-ML-App) 150C, be included in catalog 102 in the depicted embodiment; inclusion of their applications in such a catalog may, for example, expand the potential set of users of such applications. Some of the service-provider-generated applications included in catalog 103 may also be machine learning related in various embodiments (such as ML-App 150K or ML-App 150L), while other applications of catalog 103 (such as Non-ML-App 150M) may be unrelated to machine learning. In addition, in at least some embodiments, clients may design, develop and/or deploy their own applications at the MAES, such as client-developed app 150Z. In at least some embodiments, the MAES may also provide a set of tools (e.g., libraries of machine learning algorithms or machine learning models, example/reference data sets that can be used to train or test machine learning models, and the like) that may be used by clients and/or third parties to help design and develop their own applications, which may later be deployed using resources of the MAES.

To run a particular application at the MAES, e.g., in order to perform one or more machine learning operations (such as training/re-training one or more models, obtaining one or more predictions/inferences from a previously-trained version of a model, tuning model hyperparameters, and so on) or other types of operations, one or more programmatic requests may be submitted from a client device 195 via interfaces 170 in the depicted embodiment. Such a request may indicate various parameters or properties, including for example an identification of the particular application to be run, the type of operations to be performed, performance objectives for the operations, and so on in different embodiments. In the depicted embodiment, such a request may be transmitted to one or more client request handlers 150, which may in turn transmit an internal version of the request to a platform fleet manager 110 responsible for selecting the specific platforms to be used and configuring them appropriately. Platform fleet managers 110 and client request handlers 150 may be implemented using one or more computing devices in the depicted embodiment.

In at least some embodiments, for a particular application request, the platform fleet manager may determine or obtain (e.g., as a parameter of the request, or based on factors such as the problem domain of the application) an isolation policy or setting to be used, and configure one or more execution platforms 160 of the fleet 111 accordingly. Thus, for example, at execution platform 160A, where an instance of ML-App-150B is to be run, isolation policy/settings 162A may be applied. Similarly, at execution platform 160B, which may have been allocated to run an instance of ML-App-150L, isolation policy/settings 162B may be used, while at execution platform 160C, identified for an instance of client-developed application 150Z, isolation policy/settings 162C may be enforced. The respective isolation policies may reflect the security needs of the individual clients on whose behalf the applications are to be run, the sensitivity of client data sets 196 that are to be provided as inputs of the applications, the sensitivity of the output/results produced by the applications, the security objectives of the providers/vendors of the application instances, and so on in various embodiments. Isolation policies or settings may be determined for third-party applications (e.g., applications selected from catalog 102), service-provider-developed applications (e.g., applications selected from catalog 103) and/or client-developed applications in various embodiments; as such, isolation settings of the kind discussed herein may be applied regardless of the source of the application whose data and/or code is to be protected in such embodiments. In at least some embodiments, as discussed below, at least a portion of the input data sets for various applications run at the MAES may be obtained from one or more services of a provider network (such as a storage service or a database service); as such, the input data may not necessarily be obtained from client devices (as in the case of data sets 196).

As part of the configuration of the respective execution platforms 160, at least a pair of run-time or execution environments (e.g., implemented as respective software containers, virtual machines or the like) may be established in various embodiments. Thus, for example, at platform 160A, run-time environments 163A and 163B may be instantiated. At platform 160B, run-time environments 163K and 163L may be set up, and at platform 160C run-time environments 163P and 163Q may be established. Respective levels of trust (e.g., trust levels T1, T3, T7 or T9) may be assigned to individual ones of the run-time environments in accordance with the applicable isolation settings/policies 162 (e.g. 162A, 162B, and 162C) in the depicted embodiment, and corresponding sets of permissions may be granted to programs/processes running within the run-time environments. In the depicted example, among the four different trust levels, T9 represents the highest level of trust, while T1, T3, and T7 represent lower levels (not necessarily in order). Thus, for example, network communications with a program/process/thread (such as a network communications manager 165A, 165B or 165C) at trust level T9 may be permitted from a wider range of endpoints than network communications (if any) permitted with a program/process/thread (such as the application instances) at trust levels other than T9. Not all network communications may be prohibited from trust levels other than T9 in the depicted embodiment—the levels T1, T3 and T7 may differ from one another in the set of constraints regarding network access that are enforced for each of the levels. In at least one embodiment, more than two run-time environments may be instantiated at a given execution platform 160—e.g., run-time environments 163A and 163B may be configured as children environments within a higher-level run-time environment, more than one lower-trust-level run-time environment used for application instances or nodes may be set up, or more than one higher-trust-level run-time environment may be established. In other embodiments, exactly two run-time environments may be established at some or all of the execution platforms where isolation policies of the kind discussed herein are to be implemented. In some embodiments, an execution platform identified for a particular client request may already have one run-time environment pre-configured (e.g., as part of a warm pool of run-time environments established in advance), so multiple run-time environments may not have to be configured after the request is received; as such, only a second run-time environment may have to be set up in response to the request. In at least one embodiment, some execution platforms may have respective pairs of run-time environments (with different trust levels) at least partially pre-configured, so at most a small amount of configuration effort may be required after the client request is received.

One of the run-time environments at a given platform 160A may be used for the application instance, which, as indicate above, may be kept isolated to at least some extent from a network perspective in the depicted embodiment. The other run-time environment (with a higher trust level such as T9) may be used as an intermediary that is allowed to obtain potentially sensitive input data over a network (and transmit potentially sensitive results of the application, if any such results are to be transmitted, over the network) in the depicted embodiment. Thus, for example, at platform 160A, a network communication manager (NCM) 165A running at trust level T9 may obtain an input data set (to be consumed by the instance of ML-App-150B) using one or more network messages received from an endpoint outside platform 160A, and pass it via a local non-network communication mechanism to the instance of ML-App-150B running at trust level T1. The ML-App-150B instance may then implement or perform one or more machine learning operations at the run-time environment 163B. Results produced by the ML-App-150B instance, if any, may be obtained by NCM 165A using a local non-network communication mechanism, and transmitted to one or more destinations outside the platform 160A via one or more network messages in the depicted example scenario. Similarly, NCMs 165B and 165C may also act as respective intermediaries for at least some types of data and/or results that are to be obtained or transmitted via a network in the depicted embodiment, with their respective application instances (ML-App-150L or App-150Z respectively) as the eventual destinations or sources of the data or results. Note that at least for some types of operations that may be performed on behalf of clients of an MAES, results generated by the applications need not necessarily be transmitted over a network—instead, for example, some operations may result in a state change of some entity and may not produce any specific to-be-transmitted output themselves.

In at least some embodiments, in addition to limiting/customizing the network I/O transfers that are allowed as discussed above, I/O to at least some portions of persistent and/or volatile storage devices or memories may also be controlled based on the isolation policies/settings 162. For example, read or write access with respect to one or more local file systems, volumes, files, storage devices, or portions of volatile memory may be limited in a customizable manner for programs, processes or threads within the different run-time environments. In at least some embodiments, fine-grained I/O constraints may be enforced for the respective run-time environments based on the isolation policies 162—e.g., at the file level, block level, I/P (Internet Protocol) address level, port level, and so on.

In at least some embodiments, the configuration settings applied to the different run-time environments 163 (e.g. 163A, 163B, 163K, 163L, 163P, and 163Q) in accordance with isolation policies 162 may prevent unauthorized transfers or copying of sensitive data (e.g., from the less-trusted run-time environments at which the application instances run). Similarly, the isolation of the run-time environment used for the application instance from that used to communicate with the client devices or other external endpoints may also serve to protect the application—e.g., it may be made extremely difficult or impossible, using I/O configuration settings, to copy the application code or application-generated intermediate artifacts (which could potentially be used to try to reverse engineer the application's logic) to a location accessible outside the application's run-time environment. In at least some embodiments, access to one or more of the persistent and/or non-persistent storage device(s) at which at least a portion of the application instance itself and associated metadata (e.g., executable application code, source code, parameter settings, meta-parameter settings etc.) is stored may be prohibited from outside the application's run-time environment.

In one embodiment, a single execution platform may be insufficient to perform the operations requested by a client, so a cluster of execution platforms 160 may be assigned, with at least a respective node of an instance of a distributed application being run at each of the execution platforms. The nodes of the distributed application may in some cases need to exchange data with one another. In such an embodiment, the configuration settings of the individual nodes of the distributed application may be selected such that the nodes are permitted to use a network to communicate with one another, although more general network access to/from the nodes may be prohibited in at least some implementations.

Security Concerns Addressed Using Isolated Run-Time Environments

Figure 2:
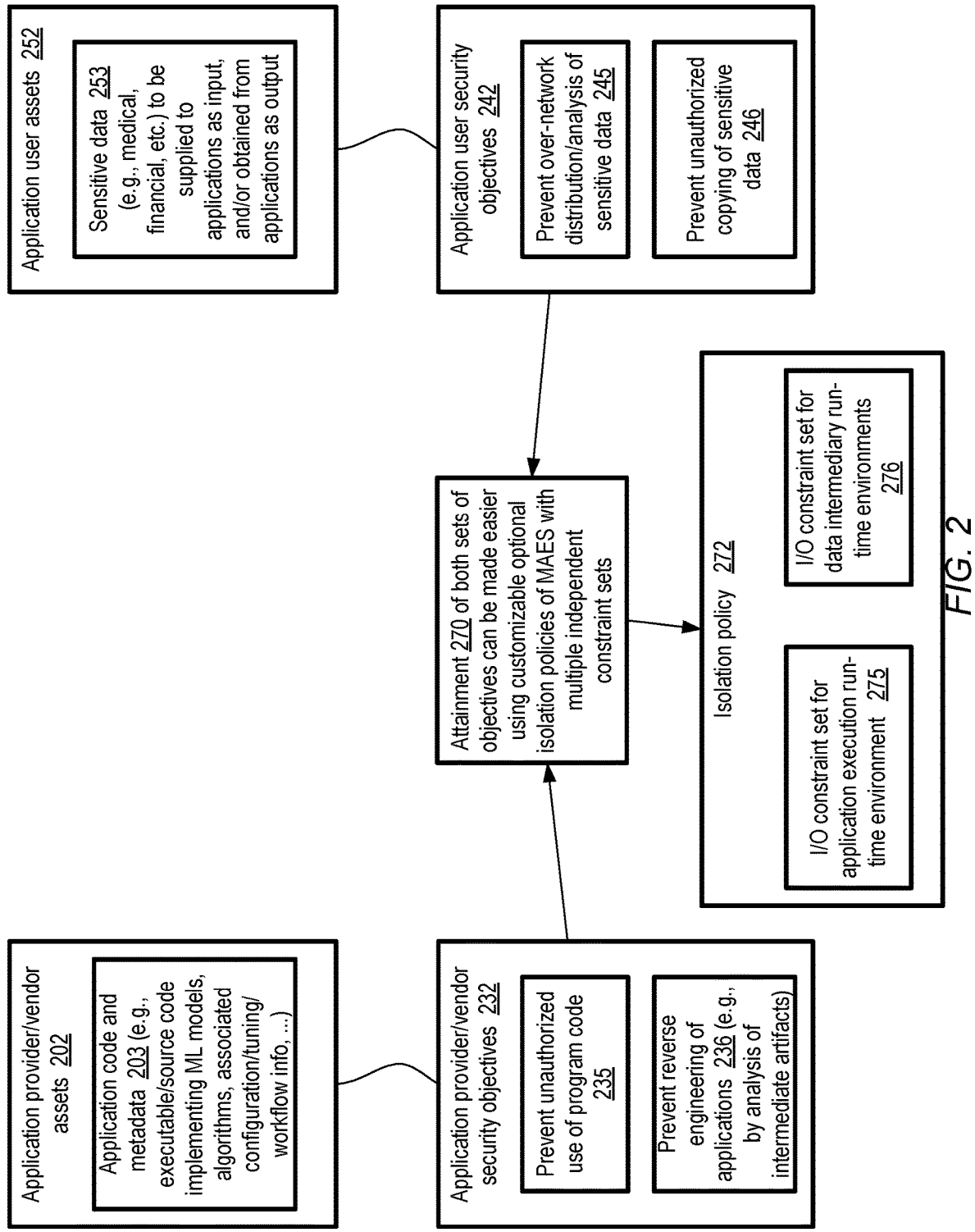
FIG. 2 illustrates example security-related concerns of data owners and application providers that may be addressed using constraint sets applied to a plurality of execution environments, according to at least some embodiments.

FIG. 2 illustrates example security-related concerns of data owners and application providers that may be addressed using constraint sets applied to a plurality of execution environments, according to at least some embodiments. In various embodiments, the assets 202 of application providers/vendors that are to be protected in a provider network environment using various security enhancing techniques may include the application code and metadata 203, while the application user assets 252 that are to be protected may include sensitive data 253. The application users may be referred to as owners of the sensitive data 253 in at least some embodiments. The application code and metadata 203 may include, for example, executable and/or source code versions of the application, such as code that implements machine learning (ML) models or algorithms, configuration/tuning information such as meta-parameter values, scripts that orchestrate workflows combining several different constituent programs of the applications, and so on. The sensitive data 253 may, for example include medical, financial or other data that may be supplied to applications as input, and/or obtained from the applications as output. In the case of medical applications, for example, the sensitive input data may include results of medical tests and diagnostics, while the sensitive output data may include predictions regarding whether a given patient suffers from or is likely to suffer from some disease or illness, etc. In the case of financial applications, the input sensitive data may represent various financial transactions, and the output sensitive data may represent such measures as credit scores.

Application provider/vendor security objectives 232 in various embodiments may include the prevention of unauthorized use 235 of the program code, the prevention of reverse engineering 236 of the applications (e.g., by an analysis of intermediate artifacts produced during the running of the application, meta-parameters or other configuration related information, log records and the like) in various embodiments. Application user security objectives may include, for example, the prevention of unauthorized distribution or analysis of the sensitive data over a network 245, as well as the prevention of unauthorized storage or copying 246 of the sensitive data (such that the data can later be examined/analyzed without the knowledge or consent of the data owner) in at least some embodiments. Of course, in order to perform operations desired by the application user (e.g., training or executing a machine learning model that can provide useful predictions/inferences), the sensitive input data may have to be obtained at the application from some data source, and the sensitive output data may have to be extracted from the application and eventually sent to some destination, potentially involving co-mingling of the assets of both types of entities (application providers and application users) at some set of shared computing platforms in various embodiments. As a result, securing both the data and the applications from potential unauthorized access/analysis may not be straightforward in such embodiments.

In at least some embodiments, control plane components of an MAES or a similar network-accessible service may decide/select the specific platforms at which a given instance of an application program is to run, and neither the application vendor nor the user/client on whose behalf the application is being run may have complete administrative control with respect to the selected platforms. In order to attain both sets of the objectives shown in FIG. 2, an MAES may support the use of customizable optional isolation policies 272 in at least some embodiments as indicated in element 270. According to such an isolation policy 272, respective independent constraint sets 275 and 276 regarding I/O operations may be enforced for (a) run-time environments in which application instances run, and (b) data intermediary run-time environments in which programs responsible for obtaining input data sets over a network and transmitting output data sets/results over a network run. Individual constraints of sets 275 and 276 may be translated into corresponding I/O (e.g., networking, storage and/or memory) configuration settings in various embodiments, e.g., within the operating systems or virtual machines/containers being used for the application instances and/or for data transfers. Some programs running within a given run-time environment may, of course, have to communicate with one or more programs in the other run-time environment in various embodiments; examples of the techniques which may be used for such cross-environment communications are described below in further detail.

Example Workflow

Figure 3:
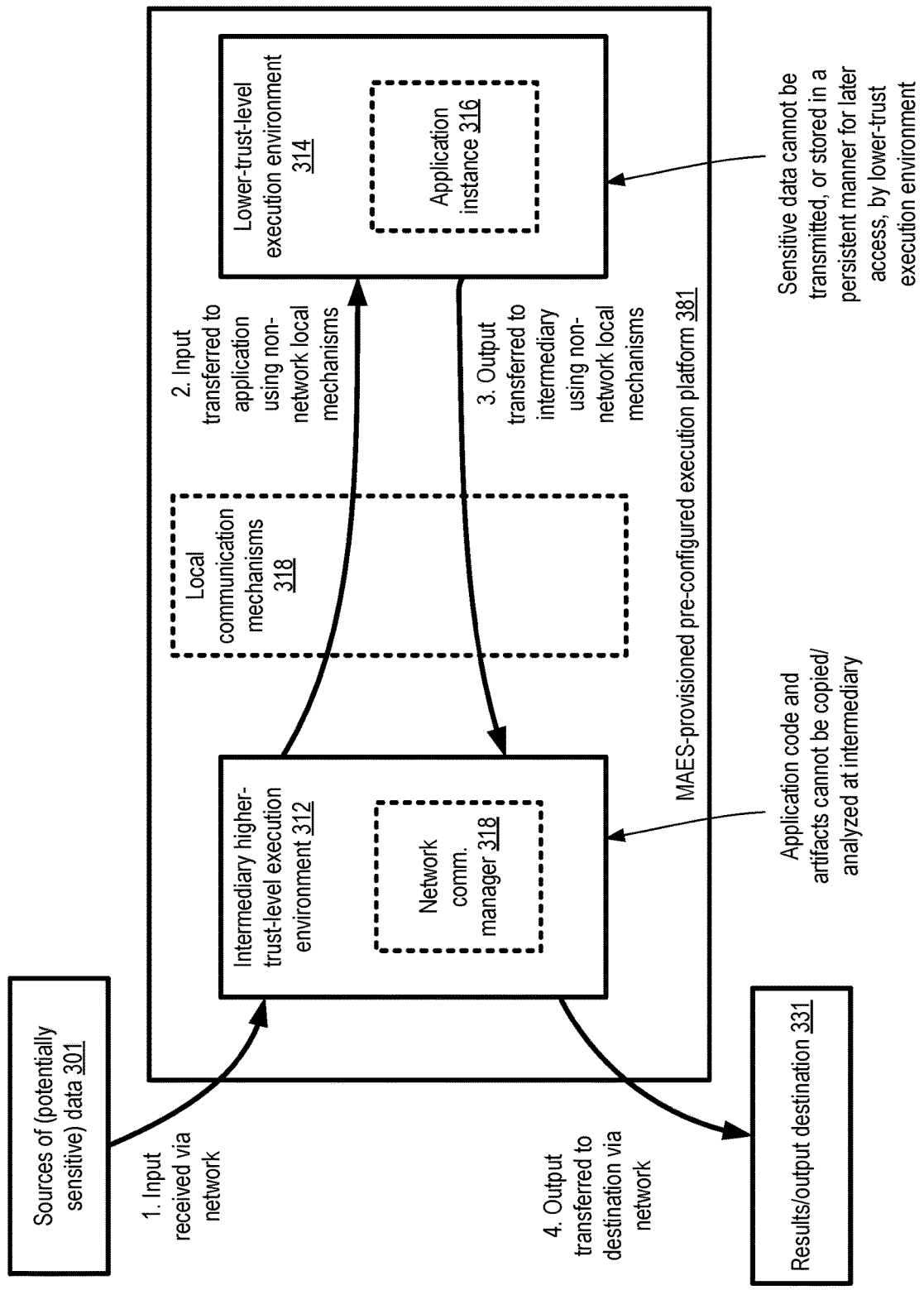
FIG. 3 illustrates an example of a workflow which may be used to secure data and programs at an execution platform, according to at least some embodiments.

FIG. 3 illustrates an example of a workflow which may be used to secure data and programs at an execution platform, according to at least some embodiments. In the depicted embodiment, a managed application execution service (MAES) may provision and at least partially pre-configure an execution platform 381 on behalf of an application user, such that the user does not have to expend time and/or other resources to quickly start using the application while ensuring the integrity of the user's potentially sensitive data, and such that the application provider/vendor does not have to expend time and/or other resources to protect the application from misuse. As such, the MAES may establish at least two execution or run-time environments at the platform 381 in various embodiments: a higher-trust-level environment 312 at which a network communication manager 318 runs and acts as an intermediary for incoming and outgoing data, and a lower-trust-level environment 314 at which an instance of the application is to run. The network communication manager 318 may comprise one or more processes and/or threads of execution in some embodiments. Similarly, the instance of the application (e.g., a machine learning model, or machine learning model training program) may comprise one or more processes and/or threads of execution in various embodiments. In at least some implementations, one or both of the execution environments 312 and/or 314 may also comprise other programs, processes and/or threads.

As indicated by the arrow labeled "1", a workflow for executing the application may include the network communication manager receiving an input data set from one or more data sources 301 via a network. At least a portion of the input data may be sensitive or confidential in various embodiments. As indicated by the arrow labeled "2", the input data sets may be transferred from the execution environment 312 to the execution environment 314 using one or more local communication mechanisms 318 in the depicted embodiment. Such local communication mechanisms, examples of which are described below, may not involve the use of hardware or software network devices in at least some embodiments. At the lower-trust-level environment 314, the application instance may process the input data, e.g., using a machine learning algorithm or some other type of algorithm, and produce a set of results as output in the depicted embodiment. Programs at the lower-trust-level execution environment 314 may be prohibited from transmitting data over a network to at least some destinations in the depicted embodiment, so it may be impossible (or at least very difficult) to transfer the potentially sensitive input data to such destinations. In addition, in at least some embodiments, the storage (if any) to which the application instance 316 may write data may be configured in such a way (e.g., using encryption with a one-time-use-only key) that, even if a copy of the input data or results were written to such storage, neither the input data nor the results could be read from that storage after the application instance completes its work and is terminated.

The results or output of the computations of the application instance 316 may be transferred to the intermediary higher trust-level execution environment using local communication mechanisms 318 in the depicted embodiment, as indicated by the arrow labeled "3". In some embodiments, the same type of local communication mechanism may be used for the results as was used for transferring the input data in the reverse direction; in other embodiments, a different type of local communication mechanism may be employed. Finally, the network communication manager 318 may transmit the output or results via one or more network messages to one or more destinations 331, as indicated by the arrow labeled "4" in the depicted embodiment. In various embodiments, programs running in the intermediary execution environment 312 may not be able to access the application instance and related metadata of execution environment 314 (e.g., because the file system(s) in which the application code and metadata reside cannot be read from the execution environment 312), so it may not be possible to copy, analyze, reverse engineer or otherwise misuse the assets of the application provider.

Example Software Container-Based Configuration

Figure 4:
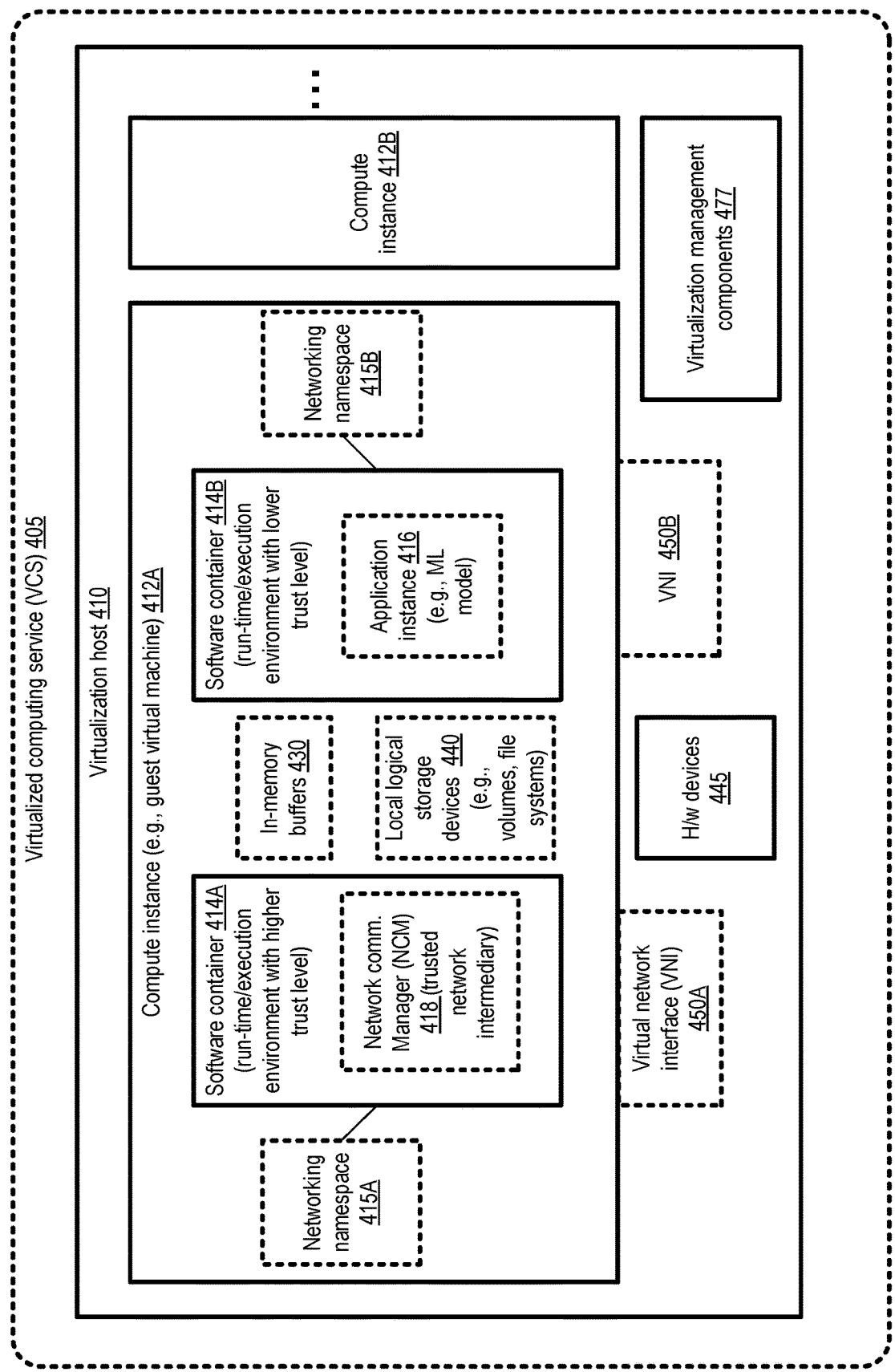
FIG. 4 illustrates an example container-based configuration comprising a plurality of run-time environments which may be used collectively at a host to secure data and programs, according to at least some embodiments.

FIG. 4 illustrates an example container-based configuration comprising a plurality of run-time environments which may be used collectively at a host to secure data and programs, according to at least some embodiments. In the depicted embodiment, the managed application execution service (MAES) may utilize resources of a network-accessible virtualized computing service (VCS) 405 to deploy application programs on behalf of MAES clients using isolation policies similar to those discussed above, e.g., in the context of FIG. 1 and FIG. 3. The VCS 405 may comprise a plurality of virtualization hosts 410, at individual ones of which one or more compute instances 412 (such as 412A or 412B) may be instantiated, e.g., at the request of an administrative component of the MAES in response to a client request to run an instance of an application. Respective compute instances 412 may, for example comprise one or more guest virtual machines (GVMs) in at least some embodiments.

A plurality of software containers (SCs) 414, such as 414A and 414B may be set up within a given compute instance or guest virtual machine in the depicted embodiment by the MAES, and individual software containers may comprise the respective run-time environments used for application instances and data transfer intermediaries. Software containers 414 may represent a method of operating system virtualization that allow users (such as administrative components of the MAES) to run an application and its dependencies in resource-isolated processes in various embodiments. Such containers may allow the packaging of an application's (or a group of applications') code, configurations, and dependencies into easy to use building blocks that deliver environmental consistency, operational efficiency, developer productivity, and version control. In various embodiments, containers may help ensure that applications deploy quickly, reliably, and consistently regardless of the details of the underlying execution platforms. Containers may enable fine-grained control over resource usage, leading to more efficient usage of the available computing infrastructure than at least some other types of virtualization techniques. In at least some embodiments, a provider network at which the VCS 405 is implemented may also implement a software container management service, which may be used by the MAES to configure the containers 414. In one embodiment, a client of the MAES and/or an application provider may generate/package their own containers, and one or more such containers may be provided to the MAES programmatically and used at compute instance 412A.

In various embodiments, a given virtualization host 410 may comprise a set of hardware devices 445 (e.g., processors/cores, volatile and/or non-volatile memory devices, persistent storage devices such as rotating disks, solid state drives (SSDs), network interface cards (NICs), peripheral devices, and the like), virtualization management components 477 (e.g., a hypervisor, an administrative virtual machine, one or more peripheral cards that perform virtualization tasks that can be offloaded from the primary processors of the host), as well as one or more compute instances 412. The virtualization management components 447 may, for example, be responsible for starting up the compute instances in response to received administrative commands, terminating the compute instances, acting as intermediaries between the compute instances and the hardware, and so on.

In the depicted embodiment, one of the software containers 414A established at a compute instance 412A on behalf of the MAES may be configured at a higher trust level, at least with respect to permissions for some types of I/O operations, than the other software container 414B. The lower trust level container 414B may be configured to run an instance 416 of an application which is to be used to perform one or more operations (such as training or executing a machine learning model) on behalf of an MAES client in various embodiments. The higher trust level container 414A may comprise a network communication manager (NCM) 418 in some embodiments, acting as a trusted network intermediary for data consumed by the application instance 416 and/or for data produced by the application instance 416. The NCM may receive one or more network messages comprising input data for the application in the depicted embodiment, and transmit one or more network messages to provide results or output of the application instance 416 to one or more destinations. An NCM 418 may comprise one or more processes or threads of execution in some embodiments. The NCM may communicate with the application instance 416 using one or more local communication channels in various embodiments, without using a network. In some embodiments, for example, a set of in-memory buffers 430 (e.g., using the main memory of host 410) may be used to transmit data to, and/or receive data from, the application instance. In one such embodiment, FIFO (first-in-first-out) pipes may be implemented for data transfer via the in-memory buffers. Such buffers may be used to stream input data to, and/or receive streaming output from, the application instance 416 in various embodiments in which the application consumes or generates large amounts of data. In at least some embodiments, a set of local logical storage devices 440, such as one or more volumes, file systems or files accessible to both execution environments 414A and 414B may be used as a local communication mechanism for data flowing in either direction.

Any combination of a number of techniques may be used to achieve the desired levels of network isolation for the different software containers in the depicted embodiment. For example, a respective networking namespace 415 (e.g., 415A or 415B) may be used for each of the containers 414, such that network devices (if any) accessible/usable from one of the containers are not accessible from the other container. Note that in some embodiments more than two namespaces may be configured at an execution platforms such as compute instance 412A—e.g., a root namespace not shown in FIG. 4 may be used for some types of administrative network operations.

In various embodiments, virtual network interfaces (VNIs) (which may also be referred to as "elastic network interfaces") may be configured at a VCS 405, enabling some networking-related attributes such as security settings, IP (Internet Protocol) addresses and so on to be transferred relatively easily between compute instances or software containers without necessarily reconfiguring physical network cards. Such attribute transfers may be accomplished, for example, by detaching a virtual network interface programmatically from one compute instance and attaching it programmatically to another compute instance. In at least one embodiment, respective VNIs 450A and 450B may be configured for use by the software containers 414A and 414B, e.g., to help manage/restrict networking operations of the containers. In at least some embodiments, a given VNI may be made accessible to only a subset of the processes or components within a compute instance—e.g., VNI 450A may be usable only from container 414A, and VNI 450B may be usable only from container 414B. VNIs may be attached and detached independently for example of the specific hardware network interface cards (NICs) of the host at which the corresponding compute instance runs in various embodiments.

In at least one embodiment, the VCS 405 may also support the establishment of isolated virtual networks (IVNs) on behalf of clients, and individual VNIs may be associated with respective IVNs. In some embodiments, IVNs may be referred to as virtual private clouds or VPCs. An IVN may comprise a collection of networked resources (including, for example, compute instances) allocated to a given client, which are logically isolated from (and by default, inaccessible from) resources allocated for other clients in other isolated virtual networks. The client on whose behalf an IVN is established may be granted substantial flexibility regarding network configuration for the resources of the IVN e.g., private IP addresses for compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. In at least some embodiments, a compute instance 412 may be established within an IVN set up on behalf of an MAES client (e.g., the client at whose request the application instance 416 is to be run), further enhancing the security of the client's data.

A given VNI 450 may be assigned one or more private network addresses (e.g., I/P addresses that are not advertised on the public Internet, or outside an isolated virtual network within which the VNI is configured) and/or zero or more public network addresses (e.g., I/P addresses reachable from the public Internet) in at least some embodiments. In at least one embodiment, the VNI 450B accessible from the lower-trust-level execution environment may not be assigned a public network address, thereby preventing traffic between the public Internet and the lower-trust-level execution environment. In some embodiments, neither VNI 450 may be assigned a public I/P address. One or more subnet identifiers (e.g., expressed in Classless Inter-Domain Routing or CIDR format) may be included among the attributes of a VNI 450 in some embodiments, such as identifiers of subnets set up by a client within an IVN in which the VNI is to be used.

In various embodiments a VNI may have a number of security-related properties which can be set on behalf of the MAES to help achieve desired levels of network isolation for the containers 414. Some provider networks may allow users to specify rules, including for example firewall-related rules, for the types of incoming and/or outgoing traffic allowed at compute instances to which a VNI may be attached. Such rules may be termed "security groups" in at least some embodiments. Various port and protocol restrictions may be enforced using such rules in some embodiments, and multiple rules may be associated with each VNI. For example, a client may use security groups to ensure that only HTTP (HyperText Transfer Protocol) and HTTPs (secure HyperText Transfer Protocol Secure) outgoing or incoming traffic is allowed, to limit the set of TCP (Transmission Control Protocol) or UDP (User Datagram Protocol) ports to which traffic is permitted, to filter incoming and outgoing traffic according to various policies, and so on. Other VNI properties may also or instead be used to help implement/enforce isolation policies at an MAES in some embodiments.

In addition to enhancing data and application security using VNIs, IVNs, and separate networking namespaces, in some embodiments the MAES may also rely to some extent on additional features of the underlying container technology (e.g., provided by a container management service of the provider network) to prevent processes/programs running within a given container from interacting with entities or objects outside the container.

In at least one embodiment, the pair of software containers (and/or the compute instance within which the containers are set up) may have a strictly limited lifetime—that is, the containers and/or the compute instance may be terminated as soon as the application instance 416 completes the requested operations. After such terminations, any memory and/or local storage device used by or from the containers may be scrubbed (e.g., filled with zeroes), thereby permanently erasing the data written to such memories or devices. Accordingly, if any sensitive data (or a portion of the application code or metadata) is written to such devices, it may no longer be available after the work of the application instance completes, further reducing the probability that such data is misappropriated. In at least one embodiment, to further increase data and application security, writes directed to a local storage device such as a volume or file system from the compute instance 412A may be encrypted, e.g., using a unique key that is generated solely for use by one or both software containers (or the compute instance within which the containers are configured) during their lifetime. Such a key may be referred to as a one-time-use-only key in various embodiments, as it may only be used prior to the termination of the containers and/or the compute instance. If/when the host 410 is re-used for some other compute instance in some embodiments, even if data written to a storage device of the host earlier has not been scrubbed or zeroed out for some reason, such data may be unreadable because the one-time-use-only key is no longer available.

In some embodiments, other computing units may be used as execution platforms providing desired levels of isolation, instead of or in addition to software containers 414 as shown in FIG. 2. For example, in some embodiments, respective compute instances or virtual machines, rather than software containers, may be used: one virtual machine running trusted intermediary programs for network-based data transfers, and another running an application instance. In other embodiments, one host may be used as a trusted intermediary, while another host with more limited network access may be used to run an application instance. In some embodiments, combinations of computation units of different types may be used: e.g., an application instance may be run in a software container within one virtual machine in a host, while a trusted data intermediary may be run within a different virtual machine (on the same host or a different host). In some embodiments, respective processes running within a non-virtualized operating system may be used as the execution environments; as such, in at least some embodiments, virtualization may not be a requirement for supporting the kinds of isolation policies described herein.

Distributed Application Example

Figure 5:
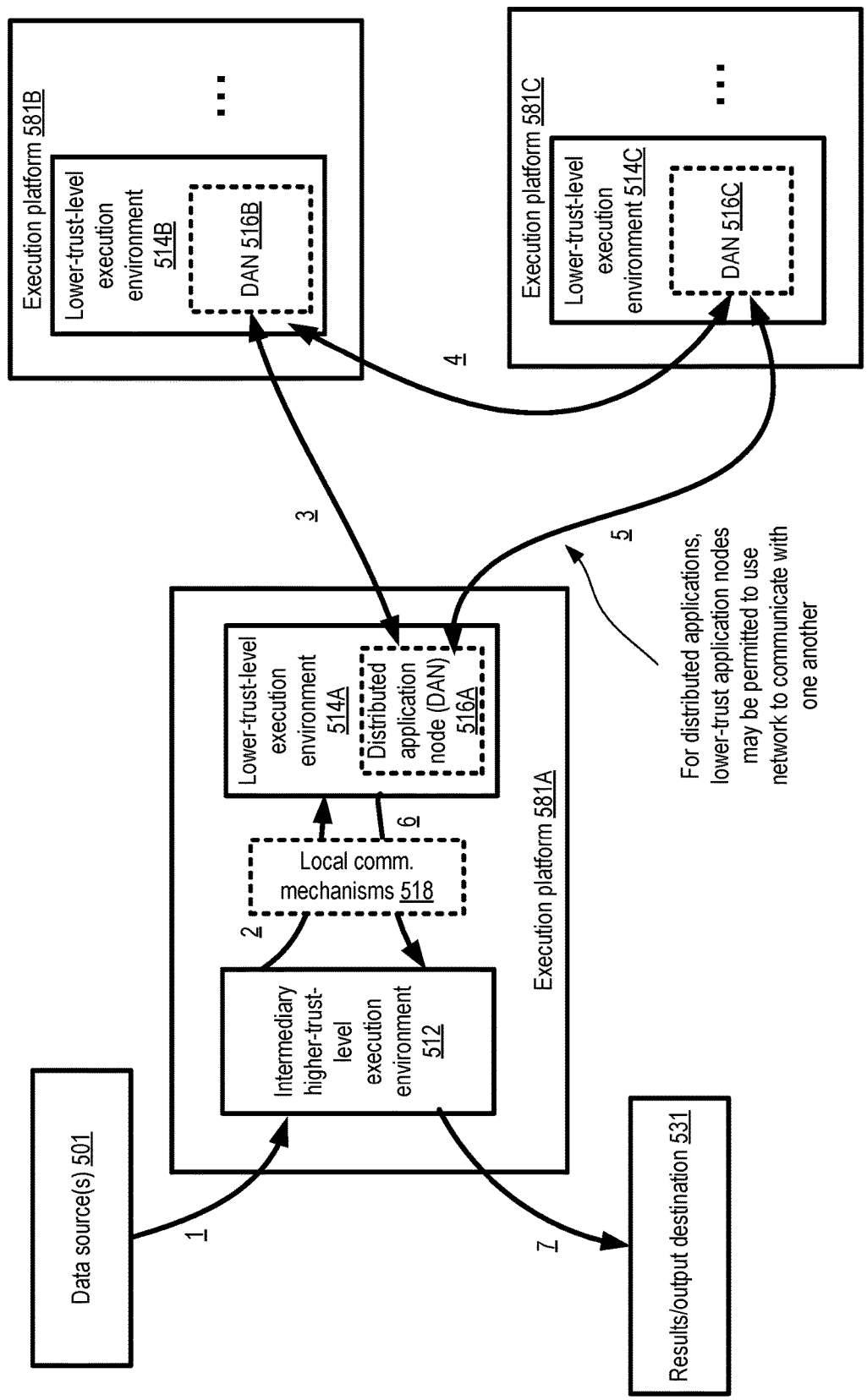
FIG. 5 illustrates an example environment in which a distributed application may be implemented securely using a plurality of run-time environments at respective nodes of a cluster, according to at least some embodiments.

In at least some embodiments, some of the operations (e.g., parallelizable machine learning model training operations that require a large amount of computation and/or a very large input data set) to be performed using isolation settings and policies similar to those discussed above may require the use of multiple virtual or physical machines. In various embodiments, a cluster comprising a plurality of application nodes, e.g., with each node running on a respective physical or virtualized server (or with some number of nodes running per server) may be used for such tasks, and the application may be referred to as a distributed application. FIG. 5 illustrates an example environment in which a distributed application may be implemented securely using a plurality of run-time environments at respective nodes of a cluster, according to at least some embodiments.

In the depicted example scenario, three distributed application nodes (DANs) 516A, 516B and 516C may be configured at respective execution platforms 581A, 581B and 581C to perform a set of operations requested by a client of an MAES, such as a distributed training of one or more machine learning models. (Other counts of DANs, such as two DANs, four DANs, hundreds of DANs etc. may be used in other embodiments, depending on the nature of the work being performed and the size of the data sets to be analyzed; the example use of three DANs shown in FIG. 5 is not intended to be restrictive.) As part of their workflow, the DANs 516 (e.g. 516A, 516B, and 516C) may need to communicate with one another—e.g., to share input data, machine learning model intermediate results, feature vectors, and the like. Accordingly, in at least one embodiment, the DANs 516 may be permitted to use a network for inbound and/or outbound network transfers, as long as such transfers are restricted to peer DANs in the depicted embodiment (i.e., to other nodes of the same application). The platforms 581 may comprise respective virtual machines or physical machines in some embodiments.

In the depicted embodiment, at least one of the execution platforms 581, such as 581A, may be configured to host a pair of execution environments 512 and 514A (e.g., comprising respective software containers, compute instances, etc.). An intermediary higher-trust-level execution environment 512 may be used to obtain input data for the distributed application from one or more data sources 501, as indicated by the arrow labeled 1 in FIG. 5. The input data may be provided to the lower-trust-level execution environment 514A, at which DAN 516A runs, from environment 512 via one or more local communication mechanisms 518 in the depicted embodiment, as indicated by the arrow labeled 2. Any of a variety of local communication mechanisms, e.g., mechanisms similar to those discussed in the context of FIG. 4, may be employed in different embodiments. From the execution environment 514A, portions of the input data set may be transmitted via a network to peer lower-trust-level execution environments 514B (with DAN 516B) and/or peer lower-trust-level execution environment 514C (with DAN 516C) in the depicted embodiment. Using the appropriate configuration settings (similar to the VNI, IVN, namespace and other settings discussed in the context of FIG. 4, for example), network messages may be permitted to flow in either direction between any pair of lower-trust execution environments 514, as indicated by the arrows labeled 3, 4 and 5. After the DANs have completed their work, results/outputs of the distributed application may be provided to the higher-trust-level execution environment 512 from the environment 514A using a local communication mechanism 518, as indicated by the arrow labeled 6 in FIG. 5. The results/output may be transmitted over a network to one or more destinations from the environment 512, as indicated by the arrow labeled 7.

Variations of the technique illustrated in FIG. 5 may be used in other embodiments for distributed applications. In some embodiments, for example, respective execution platforms 581 may each be configured with a higher-trust-level execution environment. At individual ones of the execution platforms, the higher-trust-level execution environment may be used for processes/programs that act as trusted intermediaries for network data transfers to/from the DAN running at the corresponding lower-trust-level execution environment of that platform. Thus, for example, instead of acquiring the entire input data set of the distributed application at execution platform 581A and then distributing respective subsets to other DANs, respective subsets may be obtained at each of the execution platforms. Similarly, depending on the type of output/results produced by the distributed application, instead of accumulating all the results at platform 581A, respective subsets of the results may be transmitted from individual ones of the platforms 581 in some embodiments. In some embodiments, programs (such as network communication managers) running at higher-trust-level execution environments at different execution platforms may communicate with one another (e.g., to transfer portions of input data sets, to receive results, etc.). Regardless of the specific technique used to receive input data and transmit results/output, the data and the distributed application may be protected using the kinds of isolation techniques discussed earlier. For example, processes/programs at the lower-trust-level execution environments may be prohibited, using configuration settings, from transmitting the data to undesired/un-approved destinations, saving the data at persistent storage for later access, etc., and the application code itself may not be accessible to processes/programs in other execution environments. In at least one embodiment, security of the network transfers between the lower-trust-level execution environments may be further enhanced, e.g., using TLS (Transport Layer Security) or other cryptographic techniques, or using dedicated network pathways/links of the provider network that are not shared with other applications.

Example Network Isolation Levels

Figure 6:
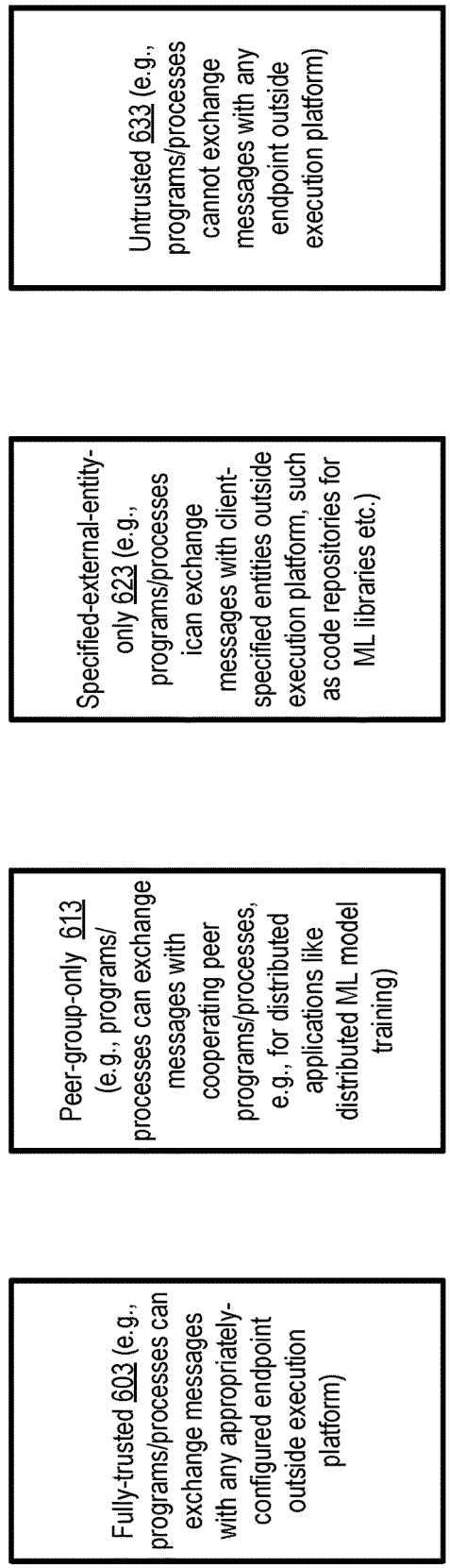
FIG. 6 illustrates example network isolation levels for run-time environments that may be supported at a managed application execution service, according to at least some embodiments.

A wide variety of applications, produced by different providers/developers (such as the MAES operator, MAES clients, third party application vendors, etc.), and with different types of security-related and networking-related needs, may be run using an MAES in some embodiments. To support such differing requirements, the MAES may provide a high degree of flexibility regarding network and other I/O isolation in various embodiments. FIG. 6 illustrates example network isolation levels for run-time environments that may be supported at a managed application execution service, according to at least some embodiments.

At one end of the isolation spectrum comprising the example isolation levels 602, some clients of the MAES may prefer to enable "fully-trusted" network isolation level 603 for programs running within at least some run-time environments (such as environments in which trusted intermediaries such as the network communication managers discussed in the context of FIG. 1 or FIG. 3 are instantiated). In the fully-trusted level, in at least some embodiments, a given program P1 may be permitted to exchange network messages with any appropriately-configured endpoint (e.g., a device with an IP address) outside the execution platform at which P1 runs. Of course, depending on the networking protocol being used, the route table entries that have been set up, and on factors such as whether P1 is running within an isolated virtual network (IVN) of the kind discussed earlier, some endpoints may not be reachable from P1 (or vice versa), so the fully-trusted isolation level may not necessarily imply that messages can be exchanged with any endpoint; only a set of appropriately configured endpoints may be reachable.

At the other end of the isolation spectrum, an "untrusted" isolation level 633 may be selected for some execution environments in the depicted embodiment. In a scenario in which untrusted isolation level 633 is employed for an execution environment, programs/processes running within the execution environment (such as instances of an application) may not be permitted to send or receive any network messages from any endpoint outside the execution platform at which the programs/processes run.

In some embodiments, such as the embodiment depicted in FIG. 5, nodes of a distributed application may need to communicate over a network with one another, but may not necessarily have to communicate with other entities. In such embodiments, a "peer-group-only" networking isolation level 613 may be supported for such applications. In such a scenario, programs/processes running at one execution platform may be permitted to exchange messages with cooperating peer programs/processes running at other execution platforms, e.g., for distributed applications such as distributed training of machine learning models.

In at least one embodiment, a fourth network isolation level may be supported. This level, which may be referred to as "specified-external-entity-only" networking 623, may be used for example in a scenario in which an application requires access to a particular set of tables in a network-accessible database instance, or to a particular repository of executable code libraries (e.g., libraries used for machine learning algorithms). The client on whose behalf the application is to be run may specify a set of networking endpoints or entities with which such over-the-network communication is to be permitted in some embodiments. In one example scenario, the application being run at an MAES may attempt to perform an image recognition task using a machine learning model, but if the results are inconclusive, the input images (or other artifacts/features, which may have been produced by the model) may have to be sent to one or more agents (e.g., human agents) for disambiguation. A network address usable to transmit such data for visual inspection may be included in the set of acceptable endpoints indicated by a client utilizing the "specified-external-entity-only" isolation level in such an example scenario. In some embodiments, in which the external entities with which message exchange is to be permitted include specific database management service (DBMS) instances at a provider network service, or a streaming data retrieval agent at a provider network service, service endpoints dedicated for such communications may be set up, e.g., within the isolated virtual networks in which the application is being run. Other isolation levels than those shown in FIG. 6 may be employed in at least some embodiments. The isolation levels shown in FIG. 6, and/or other levels, may be enforced using a variety of techniques in different embodiments, including for example the use of customized security settings for virtual network interfaces, distinct network namespaces, isolated virtual networks, and so on, similar to the techniques discussed in the context of FIG. 4. One of the isolation levels 602, such as for example the fully-trusted level or the untrusted level, may be selected by default for various execution environments used for client applications at the MAES in some embodiments. In one such embodiment, a non-default isolation level may have to be requested via a programmatic request.

Example Programmatic Interactions

Figure 7:
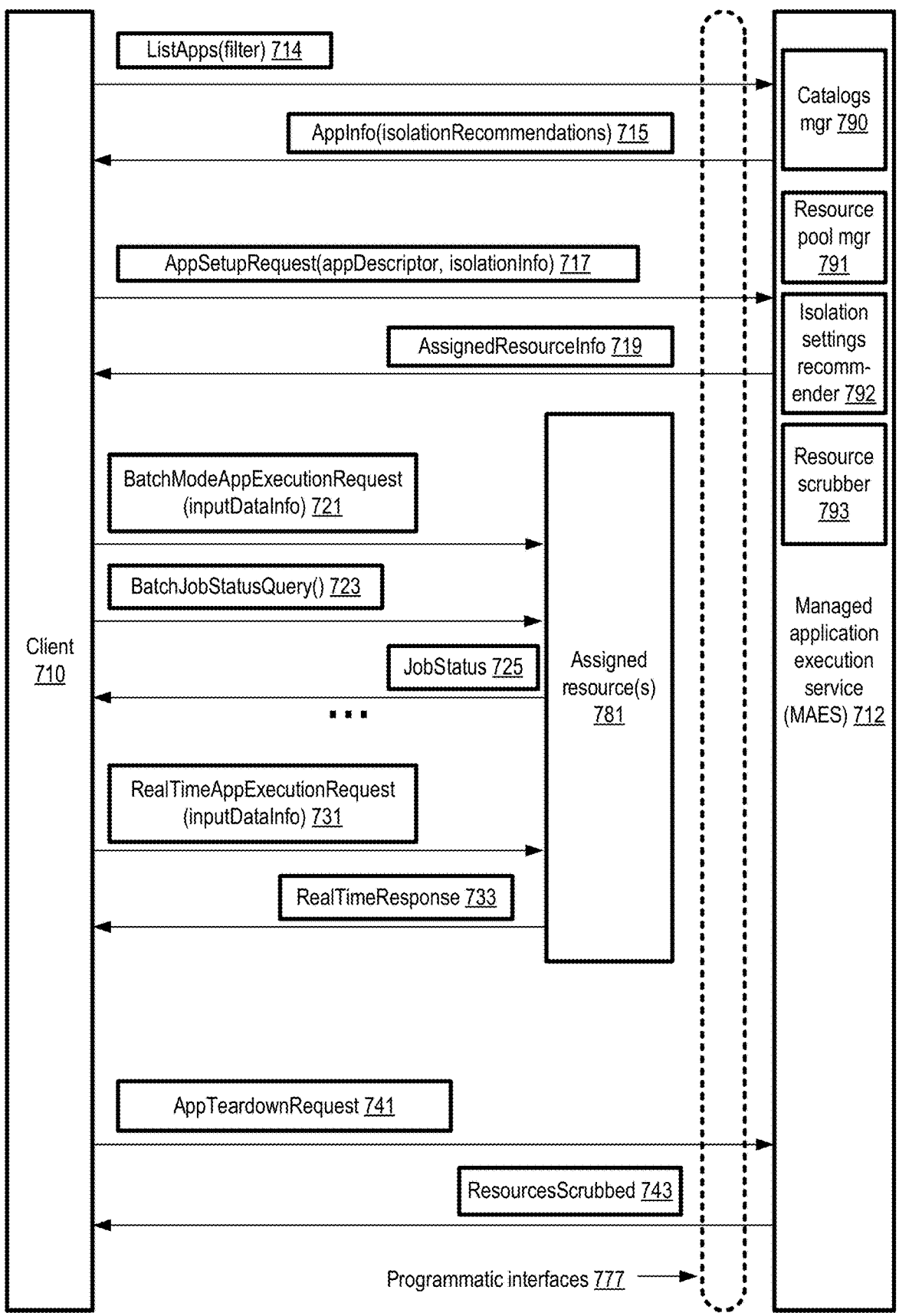
FIG. 7 illustrates example programmatic interactions between clients and a managed application execution service, according to at least some embodiments.

FIG. 7 illustrates example programmatic interactions between clients and a managed application execution service, according to at least some embodiments. In the depicted embodiment, a managed application execution service (MAES) 712 may implement a set of programmatic interfaces 777 for administrative or control plane requests from clients 710. The interfaces 777 may, for example, include one or more web-based consoles, a set of application programming interfaces (APIs), command-line tools, graphical user interfaces and the like. In some embodiments, the MAES 712 may comprise a number of administrative components involved in the selection and execution of applications with isolation settings/policies of the kinds discussed earlier, including but not necessarily limited to a catalogs manager 790, a resource pool manager 791, an isolation settings recommender 792, and/or a resource scrubber 793. Individual ones of these components may be implemented using a combination of hardware and/or software elements at one or more computing devices in various embodiments.

A client 710 may be able to select applications to be executed at the MAES from one or more online catalogs in the depicted embodiment. Such catalogs, to which new applications may be added by catalogs manager 790, or from which applications may be removed by the catalogs manager, may for example include applications provided by third parties (i.e., entities other than the operator of the MAES, or the clients who may use the applications), by the MAES or provider network operator, and so on. Client 710 may submit a ListApps request 714 via an interface 777 to view available applications from one or more catalogs in some embodiments, optionally including a filter descriptor indicating properties/capabilities of the applications to be presented. In response, the MAES may provide information about one or more applications that meet the specified filtering criteria (if a filtering criterion was indicated), or about all the available applications, e.g., via one or more AppInfo messages 715. In at least some embodiments, the MAES may include isolation level recommendations for at least some applications in the response provided to a ListApps request—e.g., based on policies of an isolation settings recommender 792, higher levels of isolation (or lower levels of trust with respect to network operations) may be recommended for some applications than others. In some embodiments, for example, isolation recommendations may be based on the type of problem domain expected to be addressed by an application, or based on how many clients have reported high levels of customer satisfaction with respect to security after using a particular set of applications. In various embodiments, the isolation settings recommender may attempt to ensure that the security concerns/objectives of clients 710 as well as the application providers (such as the concerns discussed in the context of FIG. 2) are addressed.

A client 710 may submit a request to set up a configuration of resources for an application, e.g., in the form of an AppSetupRequest 717 in the depicted embodiment. In at least some embodiments, a descriptor (appDescriptor) of the application (e.g., including the application's name or identifier within the catalog, some indication of the desired performance level, etc.) and/or an isolation setting or policy (isolationInfo) to be used when running the application may be included in such a request. As mentioned earlier, in some embodiments the MAES may use a default isolation setting for at least some applications, so the isolation information may be optional for such applications. In response to a setup request 717, in some embodiments a resource pool manager 791 of the MAES may identify a set of execution platforms for the application, configure the execution platforms (e.g., by instantiating virtual machines if needed, setting up software containers if needed, and so on), and provide information about the assigned/allocated resources in an AssignedResourceInfo message 719 to the client. In at least some embodiments, one of the benefits, to the clients, of using the MAES may include the ability of the MAES to quickly and in a repeatable manner identify and configure the appropriate combination of hardware and software resources that may be used to achieve the objectives (e.g., functionality objectives, performance objectives, security objectives and the like) of the client. In at least some embodiments, to further speed up the response to an application setup request, a set of hosts or servers from a resource pool available to the MAES 712 may be at least partially configured in advance (e.g., virtual machines may be instantiated, containers ready to run application instances may be partially or fully initialized, and so on). The AssignedResourceInfo message may, for example, include such elements as a network address that can be used by the client to communicate with one or more programs set up in an execution environment on the selected execution platform, and so on.

After the resources have been assigned/allocated and configured, a client 710 may start using the resources in the depicted embodiment. In at least some embodiments, one or more additional configuration steps (beyond those already completed by the MAES) may have to be taken by the client—e.g., the client may have to provide a set of whitelisted network addresses that can be accessed from an application instance, the client may have to indicate one or more data sources from which input data sets can be read by a trusted intermediary, or the client may have to indicate one or more destinations to which results are to be provided, etc.

In at least some embodiments, clients may run applications at the MAES in any of several modes related to the durations of the tasks being performed: real-time mode, in which immediate or near-immediate responses are expected from the application, and batch mode, which may be used for longer-duration tasks. In embodiments in which machine learning operations are being performed by the applications, examples of batch-mode tasks may include training of complex models, bulk predictions/inferences for numerous records, and so on, while examples of real-time tasks may include ad-hoc prediction requests/queries pertaining to one or a few records at a time. In some embodiments, for batch-mode operations, a polling methodology may be used with respect to the retrieval of results. In such an approach, a client 710 may submit a batch mode execution request (BatchModeAppExecutionRequest) 721 to the assigned resource(s) for the application, and later submit one or more batch job status queries 723 (e.g., at intervals selected by the client) to determine whether the results are ready. In response to individual status queries 723, in some embodiments respective job status responses 725 may be provided from the assigned resources. When the job is completed, a final result may be provided in some embodiments in response to a job status query. In effect, for batch mode operation requests, the client may not have to wait for a synchronous response from the assigned resources in the depicted embodiment. In contrast, for real-time operations, the client may submit a real time application execution request 731, and receive an instantaneous or near-instantaneous real time response 733 from the assigned resource(s).

In at least one embodiment, a client may submit an application teardown request 741 after a desired set of operations have been completed at the resources assigned to the client by the MAES. In response, the MAES may free up the resources that were assigned/allocated to the client, and at least some resources (e.g., a virtualization host) may later be re-used for other applications and/or other clients. In at least one embodiment, a resource scrubber 793 may be used to ensure that any data that was written persistently during the period of use of an execution platform is overwritten (e.g., by writing zeroes) before the storage to which the data was written is re-used.

Other types of programmatic interactions may be supported by the MAES in some embodiments, and/or some of the types of interactions illustrated in FIG. 7 may not be supported. In one embodiment, for example, a "SetIsolationDetails" request may be submitted by clients to indicate the details of the isolation level (e.g., IP addresses with which network messages are to be permitted from a container at which an application instance runs) to be used for a given execution environment or a given application node/instance.

Example Provider Network Environment

Figure 8:
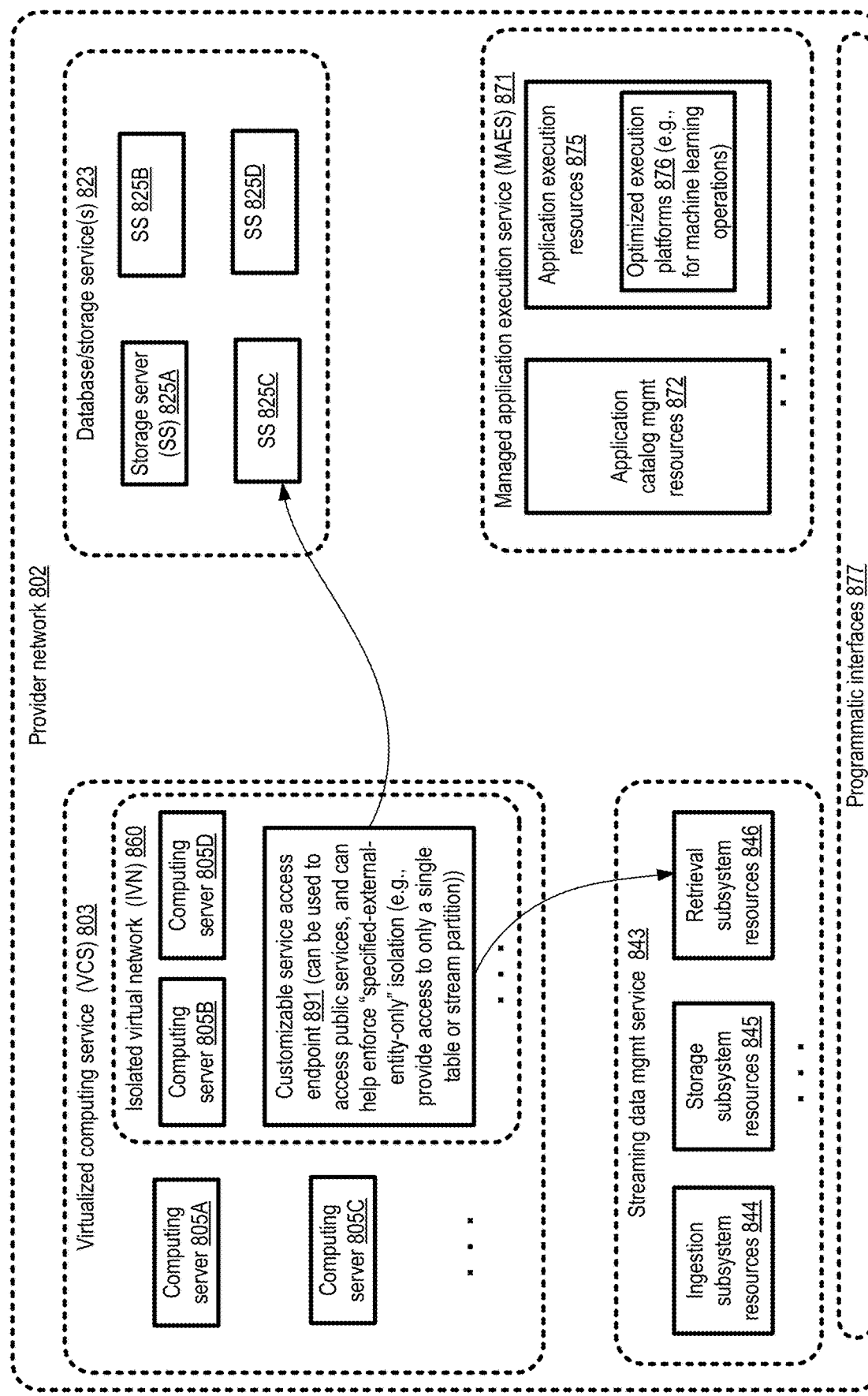
FIG. 8 illustrates an example provider network at which a managed application execution service may be implemented, according to at least some embodiments.

In some embodiments data and application isolation techniques similar to those discussed earlier, e.g., in the context of FIG. 1, may be implemented at a provider network, potentially using resources of several different network-accessible services. FIG. 8 illustrates an example provider network at which a managed application execution service may be implemented, according to at least some embodiments. As indicated earlier, networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments.

The services implemented at provider network 802 in the depicted embodiment may include, for example, a virtual computing service (VCS) 803, one or more database/storage service(s) 823, a streaming data service 843, and a managed application execution service (MAES) 871. The VCS 803 may comprise a plurality of computing servers 805, at which compute instances of various types may be instantiated for use by VCS clients in the depicted embodiment. Database/storage service 823 may comprise a plurality of storage servers 825 (e.g., 825A-825D), at which database instances of various types (relational, object-oriented, key-value-based, and so on) may be set up on behalf of clients in various embodiments. In at least one embodiment, a storage service 823 may comprise an object storage service that allows users to store unstructured data objects of arbitrary size, which can be retrieved using web services interfaces. In the depicted embodiment, a streaming data management service 843 may comprise respective sets of resources for ingesting/acquiring high volumes of data records (e.g., from a distributed set of sensors, from logs generated at large numbers of computing systems, etc.), storing such records and retrieving such records from storage for consumption by various analysis applications. These three types of tasks may be performed, for example, using resources 844 of an ingestion subsystem, resources 845 of a storage subsystem, and resources 846 of a retrieval subsystem respectively of the streaming data management service in some embodiments. In various embodiments, the input data to be consumed by one or more applications managed by the MAES may be stored at or managed with the help of one or more of the database/storage services 823 and/or at streaming data service 843. Similarly, in at least one embodiment, the destinations to which results/output of the MAES-managed applications are provided may include devices within the database/storage services 823.

The MAES 871 may have features and capabilities similar to those of MAES 105 of FIG. 1 in the depicted embodiment. For example, it may comprise application catalog management resources 872, usable to populate online catalogs of applications from a variety of sources, as well as application execution resources 875, which may coordinate the work of selecting, allocating and configuring applications on behalf of clients while ensuring the security and integrity of client data and the applications themselves. In at least one embodiment, in addition to or instead of using general-purpose computing platforms, the MAES may include or have access to a set of optimized execution platforms 876, such as servers that comprise graphical processing units (GPUs) which may help speed up some types of machine learning operations and other similar tasks. In at least some embodiments, the MAES may utilize resources of one or more of the other services of the provider network 802: for example, virtual machines at computing servers 805 of the virtualized computing service may be used to configure software containers similar to those discussed in the context of FIG. 4.

In some embodiments, instead of or in addition to an MAES that provides secure execution platforms for executing applications of any desired type, one or more services that are dedicated to providing secure, optimized execution platforms for applications of a particular type or applications pertaining to a set of related problem domains, such as machine learning or artificial intelligence applications may be implemented. Such a machine learning service may implement similar application isolation and/or data isolation techniques as those described earlier for the MAES (e.g., using pairs of run-time environments with different trust levels as in the embodiments depicted in FIG. 3 and FIG. 4) in various embodiments, but may be more narrowly focused in terms of the kinds of applications that are included in its catalogs, or the kinds of applications that clients can run. Other examples of such managed services for specific problem domains, which may implement similar isolation technique in various embodiments may include, for example, a video/graphics processing service, an audio processing service, a scientific simulation service, etc.

Computing servers 805 of the VCS 803 may, for example, include virtualization hosts similar to host 410 discussed in the context of FIG. 4 in the depicted embodiment. In some embodiments, as mentioned earlier, subsets of resources of the VCS 803 may be configured as isolated virtual networks (IVNs) on behalf of VCS clients. Thus, for example, IVN 860 may comprise compute instances or virtual machines running on computing servers 805B and 805D in the depicted embodiment. At least some of the network addresses assigned to devices within an IVN may not be visible or advertised outside the IVN—thus, for example, private IP addresses may be assigned to virtual network interfaces (VNIs) used by run-time environments set up at computing servers 805B and/or 805D. As indicated above, in some cases the input data to be consumed by the application instances managed by the MAES and run at the VCS may reside at other provider network services, such as a database or storage service 823, or streaming data management service 843. Similarly, output produced at MAES-managed applications may in some cases have to be transmitted to such other services. By default, at least some of the services 823 and/or 843 may be accessible via public IP addresses in the depicted embodiment (so that they can be used by clients from various endpoints within the public Internet, for example), and may be referred to as "public" services. In order to facilitate secure transmission of data to/from isolated virtual networks such as IVN 860 within which MAES-managed applications may be running, one or more customizable service access endpoints such as endpoint 891 may be configured in the depicted embodiment. Such endpoints may usable to access public services such as database/storage services 823 and streaming data management service 843 from devices within the IVN, without requiring public IP addresses to be configured for the devices within the IVN in at least some embodiments. In at least one embodiment, the service access endpoints 891 may be customized to help enforce network isolation levels similar to the "specified-external-entity-only" isolation level discussed in the context of FIG. 6. For example, the endpoint 891 may be programmatically configured (e.g., by the MAES control plane in response to client-specified isolation requirements) in some embodiments to allow only data from a particular database table or a particular stream partition to be read from a particular run-time environment being used by an MAES application instance or network communication manager in some embodiments. In another example scenario, the endpoint 891 may be configured to only allow writes to a particular database table or stream partition in some embodiments. As such, in at least some embodiments, service access endpoints 891 may represent another network isolation implementation tool available to the MAES, in addition to the isolated namespaces, VNI security settings and the like.

Individual ones of the services of provider network 802 may expose respective sets of programmatic interfaces 877 to its clients in the depicted embodiment. In general (as in the case of the MAES, which may use the VCS as described above) several of the services may utilize resources of other services (for example, the streaming data management service may also utilize compute instances of the virtual computing service 803 and storage devices provided by the database/storage services 823). As such, various services of provider network 802 may act as clients of other services, and may utilize the programmatic interfaces of the other services in the depicted embodiment.

In some embodiments, at least some of the techniques discussed above for implementing isolation policies to help protect sensitive data and application may be implemented without acquiring resources of network-accessible services such as those shown in FIG. 8.

Figure 9:
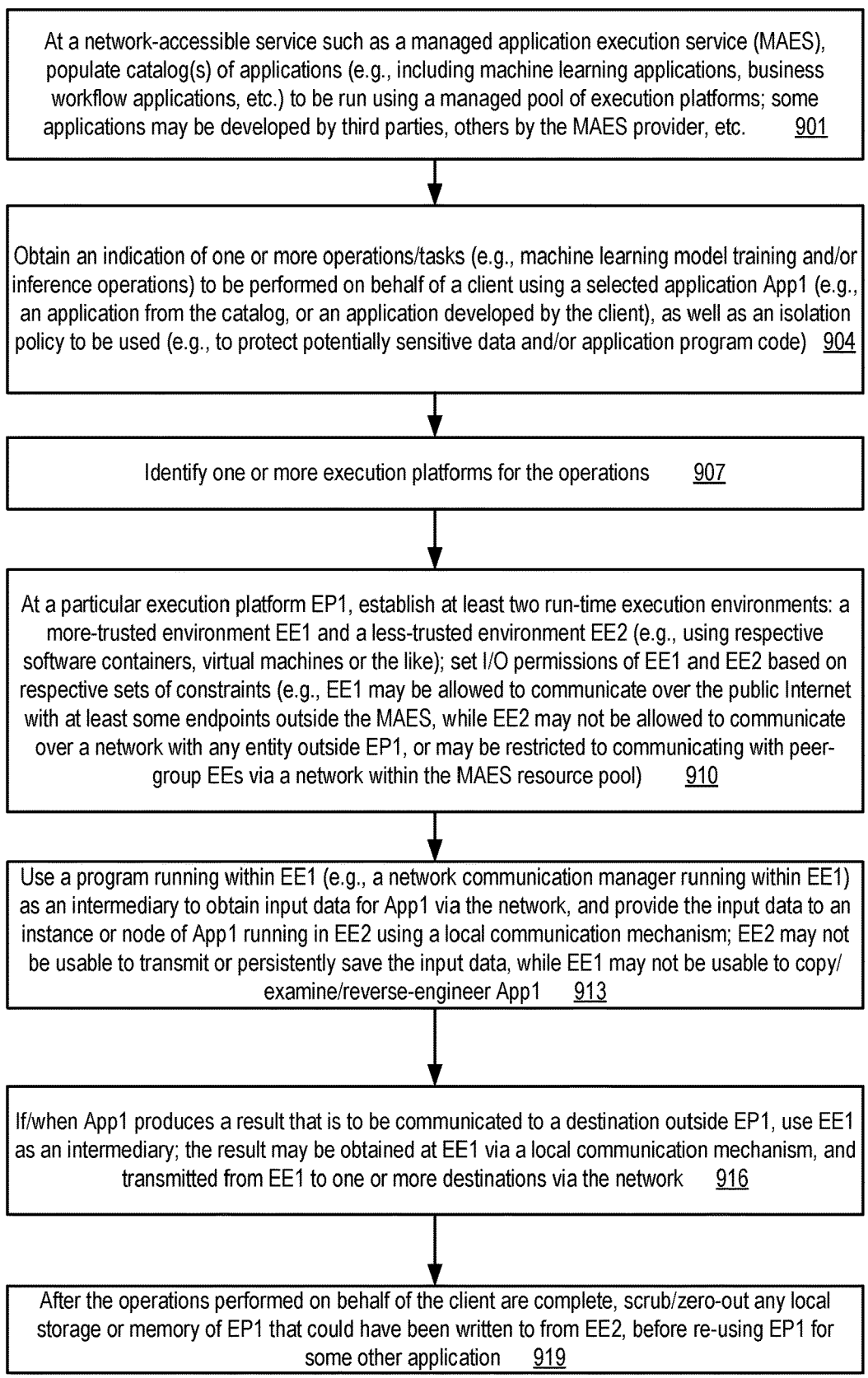
FIG. 9 is a flow diagram illustrating aspects of operations that may be performed to secure data and applications at a network-accessible service, according to at least some embodiments.

Methods for Implementing Isolation Techniques for Applications Analyzing Sensitive Data FIG. 9 is a flow diagram illustrating aspects of operations that may be performed to secure data and applications at a network-accessible service, according to at least some embodiments. As shown in element 901, one or more catalogs of applications (e.g., including machine learning applications, business workflow applications, etc.) to be run using a managed pool of execution platforms may be populated at a network-accessible service such as a managed application execution service (MAES) in the depicted embodiment. The applications may have been designed and developed at or by a variety of entity types in different embodiments. For example, in one embodiment, some applications may have been developed by third parties, others by the MAES provider, etc. the MAES may implement programmatic interfaces which can be used to request the inclusion of an application in a catalog, e.g., by third party application providers, in at least some embodiments. The MAES may also enable its clients to run their own applications using resources managed by the MAES in at least some embodiments.

An indication of one or more operations/tasks (e.g., machine learning model training and/or inference operations) to be performed on behalf of a client using a selected application App1 (e.g., an application from the catalog, or an application developed by the client) may be obtained in various embodiments (element 904). In at least some embodiments, an indication of an isolation policy to be used (e.g., to protect potentially sensitive data and/or application program code) when the operations are performed may also be obtained. In one embodiment, the indications of the application and/or the isolation policy may be provided by the client in one or more programmatic requests transmitted to the MAES. In at least one embodiment, in a scenario in which the client does not indicate an isolation policy or other security-related requirements, the MAES may determine the isolation policy to be used (e.g., based on factors such as the application domain, feedback received earlier at the MAES regarding the application, etc.).

In at least one embodiment, the MAES may have access to a pool of execution platforms that can be used for applications on behalf of MAES clients, including for example general-purpose physical servers, servers optimized for performing tasks of a particular type (such as servers equipped with GPUs that may be suitable for certain types of machine learning computations or graphics/video combinations), and so on. In some embodiments, the pool of execution platforms may include compute instances such as virtual machines set up at virtualization hosts. In some embodiments, the MAES may be implemented at a provider network which also includes one or more computing services such as a virtualized computing service, and the pool of execution platforms may be managed by one or more such services. In one embodiment, the MAES may have its own pool of execution platforms, and may not need to utilize other services. As shown in element 907, one or more execution platforms may be selected by the MAES, e.g., from such a pool, to perform the requested operations/tasks in various embodiments.

At a particular execution platform EP1, in some embodiments at least two run-time execution environments EE1 and EE2 may be established or set up (element 910). One of the execution environments (EE1) may be configured at a higher trust level (at least with respect to some types of I/O operations such as networking operations) than the other in at least some embodiments. In various embodiments, respective software containers, virtual machines or the like may be used for the execution environments, which may also be referred to as run-time environments. One or more types of I/O permissions of EE1 and EE2 may be set based on respective sets of constraints in various embodiments to enforce the targeted isolation level—e.g., programs running within EE1 may be allowed to communicate over the public Internet with at least some endpoints outside the MAES, while programs within EE2 may not be allowed to communicate over a network with any entity outside EP1, or may be restricted to communicating with peer-group EEs via a network within the MAES resource pool. In at least one embodiment, one or more of the run-time execution environments of EP1 may be at least partially preconfigured.

In various embodiments, a program running in one of the execution environments EE1 (e.g., a network communication manager running within EE1) may be employed as an intermediary to obtain input data for App1 via the network, and provide the input data to an instance or node of App1 running in EE2 using a local communication mechanism (element 913). Any of a variety of local communication channels, such as (but not limited to) in-memory buffers (which may be used for streaming data and/or pipes), local storage devices and the like discussed earlier, may be employed in different embodiments. In at least one embodiment, EE2 may not be usable to transmit or persistently save the input data, while EE1 may not be usable to copy/examine/reverse-engineer App1; as a result, sensitive application input data may be protected from potential misappropriation, and the application code and metadata may also be protected. A variety of network isolation levels (similar to those indicated in FIG. 6) with respective restrictions regarding networking may be enforced for respective applications in different embodiments.

If/when App1 produces a result or output that is to be communicated to a destination outside EP1, EE1 may again be used as an intermediary in at least some embodiments (element 916). The result or output may, for example, be obtained at a network communication manager of EE1 from the application instance/node via a local communication mechanism, and transmitted from EE1 to one or more destinations via the network. After the requested operations of the client are completed, in some embodiments the resources used for EE1 and/or EE2 may be reset and re-used. For example, on one embodiment, any local storage or memory of EP1 (e.g., storage to which writes from EE2 could have been directed) may be scrubbed or zeroed-out before EP1 is re-used for some other client or some other application of the same client (element 919).

It is noted that in various embodiments, at least some operations other than those illustrated in the flow diagrams of FIG. 9 may be used to implement the isolation management techniques described above. Some of the operations shown may not be implemented in some embodiments or may be implemented in a different order, or in parallel rather than sequentially. In at least some embodiments, operations similar to those illustrated in FIG. 9 may be performed at a network-accessible service dedicated to specific types of applications, such as a machine learning service or a graphics/video application service.

Use Cases

The techniques described above, of implementing a variety of isolation techniques to secure potentially secure input and output data of applications run using network-accessible resources, while also meeting the security needs of the application providers, may be useful in a variety of scenarios. As more and more distributed applications, especially machine learning and artificial intelligence applications that often involve analysis of large amounts of data, are migrated to provider network environments, concerns about protecting the sensitive data from misuse are growing. By using separate run-time environments for the application code and for intermediaries that perform network transfers of inbound and/or outgoing data, and by enforcing distinct sets of I/O constraints for the different run-time environments, a wide variety of customizable isolation policies may be implemented in different embodiments. As a result, the probability of misappropriation of both input and output data of the applications, as well as the probability of misuse or reverse engineering of the applications themselves, may be significantly reduced.

Illustrative Computer System

Figure 10:
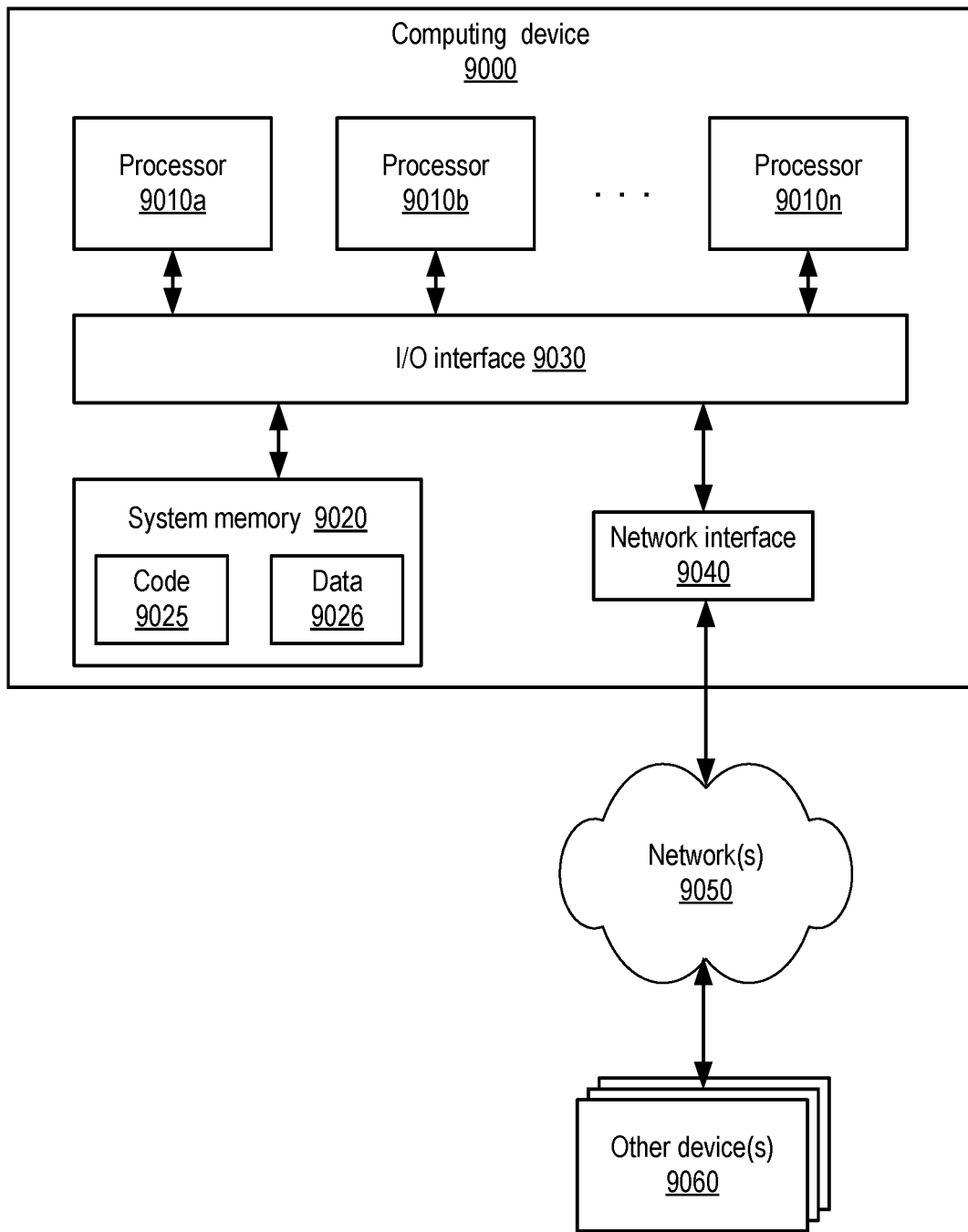
FIG. 10 is a block diagram illustrating an example computing device that may be used in at least some embodiments.

In at least some embodiments, a server that implements a portion or all of one or more of the technologies described herein, including various components of network-accessible services of a provider network and/or the client devices that interact with such services, may include a general-purpose computer system that includes or is configured to access one or more computer-accessible media. FIG. 10 illustrates such a general-purpose computing device 9000. In the illustrated embodiment, computing device 9000 includes one or more processors 9010 (e.g. 9010a and 9010b-9010n) coupled to a system memory 9020 (which may comprise both non-volatile and volatile memory modules) via an input/output (I/O) interface 9030. Computing device 9000 further includes a network interface 9040 coupled to I/O interface 9030. In at least some embodiments computing device 9000 may include a motherboard to which some or all of such components may be attached.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a network-accessible service;
wherein the one or more computing devices include one or more hardware processors and associated memory storing instructions that upon execution on or across the one or more hardware processors cause the one or more computing devices to:
obtain an indication of a first isolation policy to be used with respect to performance of one or more machine learning operations on behalf of a client, wherein the one or more machine learning operations is associated with a machine learning model and consumes input data to train the machine learning model or make an inference or prediction using the machine learning model, and the first isolation policy specifies input/output (I/O) constraints that includes:
(a) a first set of constraints for a first run-time environment of a lower trust level to use to execute the one or more machine learning operations on an input data set provided from a first set of endpoints over a network, and
(b) a second set of constraints for a second run-time environment of a higher trust level to use as an intermediary to receive the input data set over the network and provide the input data set to the first run-time environment;
allocate one or more resources, including a first resource, to perform the one or more machine learning operations;
establish, at the first resource, at least the first run-time environment and the second run-time environment, wherein in accordance with the first isolation policy, (a) a first program running in the first run-time environment is prohibited from communicating over the network with at least the first set of endpoints, and (b) a second program running in the second run-time environment is permitted to communicate with at least one endpoint in the first set over the network;
cause the second program running in the second run-time environment to obtain the input data set and provide at least a portion of the input data set to the first program running in the first run-time environment;
cause the first program to execute the one or more machine learning operations in the first run-time environment using the at least portion of the input data set, wherein the first program writes data to a persistent storage and the data written is unreadable when the persistent storage is reused by another run-time environment; and
cause a result of the first machine learning operation to be transmitted from the second run-time environment to one or more destinations.

2. The system as recited in claim 1, wherein the one or more computing devices include further instructions that upon execution on or across one or more processors further cause the one or more computing devices to:
configure a first virtual network interface, wherein one or more configuration settings of the first virtual network interface prohibit communication from the first run-time environment with at least the first set of endpoints.

3. The system as recited in claim 1, wherein the one or more computing devices include further instructions that upon execution on or across one or more processors further cause the one or more computing devices to:
cause an indication of a recommended isolation policy for at least one machine learning operation to be presented to one or more destinations.

4. The system as recited in claim 1, wherein in accordance with the first isolation policy, the first program is permitted to communicate over a network with one or more cooperating peer programs that run at respective other resources of a plurality of resources collectively assigned to perform the one or more machine learning operations.

5. The system as recited in claim 1, wherein the one or more computing devices include further instructions that upon execution on or across one or more processors further cause the one or more computing devices to:
cause the data written to the persistent storage from the first program to be encrypted using a one-time-use-only key.

6. A method, comprising:
performing, at one or more computing devices:
configuring, at a first resource to be used to perform one or more machine learning operations, at least a first execution environment and a second execution environment, wherein the one or more machine learning operations is associated with a machine learning model and consumes input data provided from an external data source over a network to train the machine learning model or make an inference or prediction using the machine learning model, wherein the second execution environment is configured to act as an intermediary to provide the input data from the external data source to the first execution environment, and wherein:
  (a) the first execution environment is of a lower trust level and configured with first input/output (I/O) permissions to run a first program based at least in part on a first set of constraints, and
  (b) a second execution environment is of a higher trust level and configured with second I/O permissions to run a second program based at least in part on a second set of constraints;
causing the second program running in the second execution environment to obtain an input data set and provide at least a portion of the input data set to the first program running in the first execution environment;
causing the first program to execute the one or more machine learning operations in the first execution environment using the at least portion of the input data set, wherein the first program writes data to a persistent storage and the data written is unreadable when the persistent storage is reused by another run-time environment; and
causing a result of the first machine learning operation to be provided from the second execution environment to one or more destinations.

7. The method as recited in claim 6, wherein the first execution environment comprises one or more of: (a) a software container, or (b) a compute instance of a virtualized computing service.

8. The method as recited in claim 6, further comprising performing, at the one or more computing devices:
  obtaining a programmatic request from a client of a machine learning service, wherein the programmatic request indicates that the first program is to be used to perform the one or more machine learning operations.

9. The method as recited in claim 6, further comprising performing, at the one or more computing devices:
  causing an indication of a catalog of machine learning programs that can be executed using resources of a machine learning service to be presented via one or more programmatic interfaces, wherein the catalog includes the first program; and
  obtaining an indication that the first program has been selected from the catalog to perform the one or more machine learning operations.

10. The method as recited in claim 6, wherein the first machine learning operation comprises one or more of: (a) a batch operation or (b) a real-time operation.

11. The method as recited in claim 6, wherein the second execution environment is configured to prevent copying or analyzing of application code or artifacts associated with the first program in the second execution environment.

12. The method as recited in claim 6, further comprising performing, by the one or more computing devices:
  obtaining, via a programmatic interface from an entity on whose behalf the one or more machine learning operations are to be performed, an indication of one or more of: the first set of constraints, or the second set of constraints.

13. The method as recited in claim 6, wherein the first set of constraints includes constraints on one or more of: (a) inbound network communications, (b) outbound network communications, (c) reads from at least a portion of a persistent or non-persistent storage device or (d) writes to at least a portion of a persistent or non-persistent storage device.

14. The method as recited in claim 6, wherein to provide the portion of the input data set, a second program running at the second execution environment performs one or more write operations to a local storage device accessible from the first execution environment.

15. The method as recited in claim 6, wherein to provide the portion of the input data set, a second program running at the second execution environment utilizes one or more in-memory streaming data buffers or pipes.

16. One or more non-transitory computer-accessible storage media storing program instructions that when executed on or across one or more processors cause one or more computer systems to:
  establish, at a first resource to be used to perform one or more machine learning operations, at least a first execution environment and a second execution environment, wherein the one or more machine learning operations is associated with a machine learning model and consumes input data provided from an external data source over a network to train the machine learning model or make an inference or prediction using the machine learning model, wherein the second execution environment is configured to act as an intermediary to provide the input data from the external data source to the first execution environment, and wherein:
    (a) the first execution environment is of a lower trust level and configured with first input/output (I/O) permissions to run a first program based at least in part on a first set of constraints, and
    (b) the second execution environment is of a higher trust level and configure with second I/O permissions to run a second program based at least in part on a second set of constraints;
  cause the second program running in the second execution environment to obtain an input data set and provide at least a portion of the input data set to the first program running in the first execution environment;
  cause the first program to execute the one or more machine learning operations in the first execution environment using the at least portion of the input data set, wherein the first program writes data to a persistent storage and the data written is unreadable when the persistent storage is reused by another run-time environment; and
  cause a result of the first machine learning operation to be provided from the second execution environment to one or more destinations.

17. The one or more non-transitory computer-accessible storage media as recited in claim 16, further comprising program instructions that when executed on or across one or more processors further cause the one or more computer systems to:
  determine that a programmatic request has been submitted by a client of a network-accessible service, wherein the programmatic request indicates that the first program is to be used to perform the one or more machine learning operations.

18. The one or more non-transitory computer-accessible storage media as recited in claim 16, further comprising program instructions that when executed on or across one or more processors further cause the one or more computer systems to:
  determine, via a programmatic interface, an indication of one or more of: the first set of constraints, or the second set of constraints.

19. The one or more non-transitory computer-accessible storage media as recited in claim 16, wherein the first set of constraints includes constraints on one or more of: (a) inbound network communications, (b) outbound network communications, (c) reads from at least a portion of a persistent or non-persistent storage device or (d) writes to at least a portion of a persistent or non-persistent storage device.

20. The one or more non-transitory computer-accessible storage media as recited in claim 16, further comprising program instructions that when executed on or across one or more processors further cause the one or more computer systems to:
  configure a first virtual network interface of the first execution environment, wherein one or more configuration settings of the first virtual network interface enforce at least a subset of the first set of constraints.

* * * * *